(12) United States Patent
Hardman et al.

(10) Patent No.: US 8,396,812 B2
(45) Date of Patent: Mar. 12, 2013

(54) METHOD OF, AND SYSTEM FOR, REAL ESTATE INDEX GENERATION

(75) Inventors: Matthew Bryce Hardman, Sydney (AU); Danika Joy Wright, Sydney (AU)

(73) Assignee: Ares Capital Management Pty Ltd, Sydney (AU)

( * ) Notice: Subject to any disclaimer, the term of this patent is extended or adjusted under 35 U.S.C. 154(b) by 754 days.

(21) Appl. No.: 12/527,832

(22) PCT Filed: Feb. 26, 2008

(86) PCT No.: PCT/AU2008/000244
§ 371 (c)(1),
(2), (4) Date: Oct. 29, 2009

(87) PCT Pub. No.: WO2008/104018
PCT Pub. Date: Sep. 4, 2008

(65) Prior Publication Data
US 2010/0057538 A1    Mar. 4, 2010

(30) Foreign Application Priority Data
Feb. 26, 2007   (AU) ................................ 2007900955

(51) Int. Cl.
*G06Q 50/00* (2012.01)
(52) U.S. Cl. ....................................................... 705/313
(58) Field of Classification Search ................... 705/313
See application file for complete search history.

(56) References Cited

U.S. PATENT DOCUMENTS

| 7,822,691 | B1 * | 10/2010 | Kuo | 705/313 |
| 2009/0018975 | A1 * | 1/2009 | Geltner et al. | 705/400 |
| 2009/0327157 | A1 * | 12/2009 | Dunne | 705/36 R |

FOREIGN PATENT DOCUMENTS
AU    2005242118 A1 * 12/2005

OTHER PUBLICATIONS

Pace, Kelley; Barry, Ronald; Gilley, Otis; Sirmans, C.F. "A method for spatial-temporal forecasting with an application to real estate prices." Apr. 2000. International Journal of Forecasting. vol. 16, Issue 2. pp. 229-246.*

* cited by examiner

*Primary Examiner* — Jami A Plucinski
*Assistant Examiner* — Vern Cumarasegaran
(74) *Attorney, Agent, or Firm* — Pillsbury Winthrop Shaw Pittman LLP

(57) ABSTRACT

A method and system for generating a real estate property index uses real estate data including price data, property data and time of sale data that are entered into a computing apparatus. The time of sale data is manipulated to provide consecutive triple times giving two consecutive time periods (e.g., March, April, May 2007 and April, May, June 2007). A transform function, preferably a log function, is generated with two time dummy variables, and the coefficients of the two time dummy variables are extracted and added to generate a transformed growth rate. The reverse transform function, preferably an anti-log function, is generated to provide the desired untransformed growth rate.

12 Claims, 6 Drawing Sheets

Housing Tenure Distribution
Sydney, Melbourne, Brisbane and Australia

Housing Tenure Distribution
Sydney, Melbourne, Brisbane and Australia

Costs of Home-Ownership

Fig. 4: The Estimated Hedonic House Price Index

METHOD OF, AND SYSTEM FOR, REAL ESTATE INDEX GENERATION

CROSS REFERENCE TO RELATED APPLICATIONS

This application is a U.S. National Phase entry under 35 U.S.C. §371 of International Application PCT/AU2008/000244, filed Feb. 26, 2008, and which claims priority under the Paris Convention to Australian patent application No. 2007900955, filed Feb. 26, 2007, the entire contents of each of which are incorporated herein by reference.

FIELD OF THE INVENTION

The present invention relates to computer generated digitally encoded electric waveforms used in the implementation of novel financial systems and methods. In the description contained herein, the invention is primarily concerned with data process methods and systems for computing property index values, automated property valuations, and financial derivative values.

COPYRIGHT NOTICE

This document contains material which is subject to copyright. The applicant as copyright owner has no objection to the reproduction of this patent document in its entirety as it appears in the Patent Office files or records, but otherwise reserves all copyright rights whatsoever.

BACKGROUND ART

Residential and commercial real estate are the world's two largest tangible asset classes. Residential real estate accounts for the bulk of the average household's wealth portfolio. Understanding the pattern of price movements in residential and commercial real estate is therefore of vital importance to households, policy-makers, regulators, businesses and investors. Historically, accurate measures of the time-series changes in the risk and return characteristics of residential and commercial real estate assets have been extremely hard to come by. In turn, the valuation of individual property assets using automated and/or statistical property valuation systems has been a hazardous practice. Finally, the development of financial derivative and futures contracts based on proxies for the residential and commercial real estate asset class have been hindered by poor index design.

The present specification is primarily concerned with two core areas: 11 (1) unique data collection methods and processing systems for quantifying, measuring, evaluating and ultimately outputting estimates of time-series risk and return movements in residential and commercial real estate portfolios; and, 11 (2) unique data collection methods and processing systems for quantifying, measuring, evaluating and ultimately outputting estimates of the values of various derivative financial instruments that enable capital markets participants to secure synthetic investment exposures to residential and commercial property assets, or to synthetically hedge against the risk inherent in the ownership of such assets, amongst other things.

In reviewing the background art, two key areas of focus are: (1) the extant evidence surrounding the development of property indices; and (2) the extant evidence on the use of index-linked property derivatives and other types of financial contracts;

1. Data processing, evaluation, and index-output systems

Historically, there has been a great deal of public criticism from economists, commentators, regulators and policymakers about the integrity of the existing sources of property price performance.

Ian Macfarlane, the former Governor of the Reserve Bank of Australia said:

"Housing . . . is an extremely important asset class for most people, yet the information we have on prices is hopeless compared with the information we have on share prices, bond prices, and foreign exchange rates . . . . It really is probably the weakest link in all the price data in the country so I think it is something that I would like to see resources put into."

The criticism has a common basis: that the dynamics of the price performance measures do not accurately reflect the dynamics of the true property values, for a combination of three possible reasons:

i. The sample of property sales used to construct the measures is insufficient or biased,
ii. The sample of property sales used to construct the measures is obtained a significant time after the actual transactions have occurred and thus the measures represent past, not present conditions, and
iii. The statistical measures calculated from the sample of property sales are not accurate or meaningful representations of changes in value of the population of properties from which the sample is taken.

GENESIS OF THE PRESENT INVENTION

The genesis of the present invention is a desire to develop a portfolio of data processing, evaluation, and index-output arrangements to comprehensively address these deficiencies. Such new data processing, evaluation, and index-output systems will be commercially useful to any individual or organisation interested in examining four key issues:

1. Estimating residential and commercial property valuations over time;
2. Measuring historical residential and commercial property returns in a given suburb, postcode, region, city or nationally over any given period of time (eg, months or years);
3. Measuring historical residential and commercial property risks in a given suburb, postcode, region, city or nationally over any given period of time (eg, months or years); and
4. Forecasting future residential and commercial property returns or risks in a given suburb, postcode, region, city or nationally over any given period of time (eg, months or years).

In particular, the data processing, evaluation, and index-output systems will almost certainly be of interest to the following clientele:

Businesses which own their premises
Mortgage lenders;
Mortgage insurers;
Participants in the media;
Commonwealth, State and Local Governments;
Universities;
Economists and consultants;
Investment bankers;
Listed property investors;
Property developers;
Building materials manufacturers or suppliers;
Existing or potential home owners;
Existing or potential investment property owners;
Potential home/investment property buyers;
Mortgage brokers;
Financial planners.

SUMMARY OF THE INVENTION

In accordance with a first aspect of the present invention there is disclosed a method of generating a digitally encoded electric signal which represents a real estate property index, said method comprising the steps of:
  i. inputting into a data store of a computing apparatus real estate data comprising property data, price data and time of sale data representing historical real estate sales transactions in a predetermined real estate market,
  ii. using said computer apparatus to manipulate said real estate data to group same into consecutive triple times based on said time of sale data,
  iii. using said computer apparatus to generate a transform function using said manipulated data with two time dummy variables corresponding to two consecutive time periods respectively bounded by the triple consecutive times,
  iv. using said computer apparatus to extract the coefficients of the two time dummy variables of said transform function for said two consecutive time periods,
  v. adding said two extracted coefficients in said computer apparatus to generate a transformed growth rate from the first to the last of said triple times, and
  vi. generating said digitally encoded electric signal which represents said index from said transformed growth rate by calculating the reverse transform function thereof.

In accordance with a second aspect of the present invention there is disclosed a method generating a real estate property index, said method comprising the steps of:
  i. inputting into a data store of a computing apparatus real estate data comprising property data, price data and time of sale data representing historical real estate sales transactions in a predetermined real estate market,
  ii. using said computer apparatus to manipulate said real estate data to group same into consecutive triple times based on said time of sale data,
  iii. using said computer apparatus to generate a transform function using said manipulated data with two time dummy variables corresponding to two consecutive time periods respectively bounded by the triple consecutive times,
  iv. using said computer apparatus to extract the coefficients of the two time dummy variables of said transform function for said two consecutive time periods,
  v. adding said two extracted coefficients in said computer apparatus to generate a transformed growth rate from the first to the last of said triple times, and
  vi. generating said index from said transformed growth rate by calculating the reverse transform function thereof.

In accordance with a third aspect of the present invention there is disclosed a system for generating a digitally encoded electric signal which represents a real property index, said system comprising:
  i. a data store into which is input real estate data comprising property data, price data and time of sale data representing historical real estate transactions in a predetermined real estate market,
  ii. data manipulation means connected to said data store to manipulate said real estate data into groups of consecutive triples times based on said time of sale data,
  iii. generation means connected to said data manipulation means to generate a transform function using said manipulated data with two time dummy variables corresponding to two consecutive time periods respectively bounded by a triple consecutive times,
  iv. coefficient extraction means connected with said generation means to extract the coefficients of the two time dummy variables of said transform function for said two consecutive time periods,
  v. adding means connected to said coefficient extraction means to add said two extracted coefficients to generate a transformed growth rate from the first to the last of said triple times, and
  vi. reverse transfer function generation means connected to said adding means to generate said digitally encoded electric signal which represents said logarithmic growth rate by calculating the reverse transform of said transformed growth rate.

The transform function is preferably a logarithmic function.

Conventional property indices afford a summarised measure of the price performance of the assets in a market through time. In the context of the market for residential real estate, however, there are a number of complicating factors. Identifying the accurate and unbiased estimation of movements in real estate prices is of real practical importance, since understanding this market helps to explain macroeconomic patterns of aggregate wealth and investment behaviour. This is because real estate is, with the exception of human capital, the largest and most widely held asset class in the world. It follows that few real tradeable assets are as pervasive to every social niche as real estate. Yet, for it its size, it is one of the most poorly understood, measured and managed assets.

While the most general concept of real estate encompasses all buildings, developed land and vacant land, residential real estate can be defined as that component of developed urban land that is designated for housing. The other primary real estate market is commercial, which is divided into office, retail, industrial and (often) hotels. To an extent, all property[i] markets are driven by common broad macroeconomic movements. In particular, both business cycles and long term socioeconomic factors, such as migration and employment, exhibit a causal relation between price and volume movements in the different real estate markets. Similarly, there exist parallels between the influences of microeconomic factors across real estate markets. The commercial real estate markets compete with the residential for the same parcels of land which are supplied by government bodies through zoning mechanisms. Furthermore, because real estate is tied to its location (a characteristic termed in the literature as "spatial fixity" or "spatial immobility") it is likely that demographic and socioeconomic factors of an area will be reflected in both residential and commercial real estate markets.

In spite of the broad analogies between real estate markets, it is important to delineate measurement and analysis of the residential from the non-residential sector since a number of issues, while universal to all property markets (and one might argue for all asset markets in general), are magnified in the context of the housing market. These include liquidity, heterogeneity, transparency, and the availability and timeliness of data.

In a perfect market of homogenous goods, indices are designed to capture price movements and are generally implemented by a relatively straightforward algorithm. The residential real estate market, however, has a number of characteristics that render standard techniques used in other markets flawed. The fundamental difficulty with estimating price trends in housing is that unlike other financial assets, houses are extremely heterogeneous and rarely traded, and there is no centralised market for their transactions. Since the vast majority of homes are not transacted in a given time period, it remains an uncertain and difficult methodological problem to translate recent transaction data into an accurate measure of the value of the overall housing stock. These issues—liquidity, heterogeneity, transparency, and data integrity—will in turn be discussed for the remainder of this section.

In most housing markets around the world, less than 10 percent of the total population of residential properties turns over every year on average. For the Australian market, it is estimated that only around 6 percent of the entire housing stock turns over every year. A corollary to this is that holding periods for housing assets are relatively high. The average holding period for houses in Australia for example is over 6 years. FIG. 1 illustrates the cumulative distribution of tenure patterns for the Australian housing market and that of Sydney, Melbourne and Brisbane separately. Around 50 percent of the housing stock turns over within 5 years for all markets, but the remaining 50 percent takes up to 25 years to turn over.

The high costs of trade in residential real estate markets dissuade active trading, and that the extensive role played by governments at both State and Federal levels in the market for residential real estate exacerbates these costs. The influence of governments in housing markets is particularly acute through tax legislation. The costs associated with home-ownership in Australia are illustrated in FIG. 2.

The housing market is highly heterogeneous. On top of the illiquidity issue, this further complicates empirical analysis of the residential real estate market. The composition across regions of the characteristics of each house is highly disparate, and that consequently, the urban housing market is not one perfect market but a set of interrelated submarkets. Even within these sub-markets, however, the characteristics of housing units can differ considerably. In particular, the spatial immobility of housing means that location alone is a point of difference between houses. Consumers of housing (homebuyers) face a limited ability to substitute between houses with differing characteristics. Substitution is also limited from an analytical perspective. In a liquid market, the same or at least very similar assets are expected to be observed in multiple time periods, and so heterogeneity is not such a concern. Conversely, in an illiquid market of homogenous assets, assets of interest may be substituted between periods without capturing changes in quality.

The third issue related to the performance of residential real estate is transparency. Transparency refers to the ability of buyers and sellers to observe information related to the supply and demand sides of the market, the transactions that are executed and other market participants, both contemporaneously and historically. Residential real estate markets, however, are typically highly decentralised; an observation made in recent reports by the Reserve Bank of Australia (RBA) and International Monitory Fund (IMF). Furthermore, information relating to transactions of properties is subject to privacy legislation. These factors restrict the efficient dissemination of information and contribute to the high transaction costs of trading residential real estate. Because information is not as efficiently diffused through the real estate market, as it is thought other markets, the random arrival of buyers and sellers increases the probability of a transaction price not representing worth. This further complicates the measurement of the empirical performance of residential real estate markets.

The availability of detailed cross-sectional and historical data is needed to accurately measure and to assess price performance in residential real estate markets. This is because of the heterogenous nature of housing. Such characteristic information is required in order to control for qualitative differences between properties. However, at least for Australia, the data currently available is insufficient for this purpose.

The RBA identifies the lack of timeliness of data as the most important issue to measuring aggregate prices in residential real estate markets. The RBA argues that as a result of the decentralisation of the market and the poor transparency of trades, most data is obtained from State Government Land Titles Offices which are recorded up to several months after settlement. As a frustrating consequence, the most recent data is not equivalent to contemporaneous market movements, and empirical analysis of current movements is delayed.

The relative sizes of the Australian residential and commercial property markets (and its components) are shown in FIG. 3.

Residential property accounted for $176B or 86% of transactions by $ value in Australia 2006. The $29B of commercial property transactions for 2006 were divided amongst its 4 categories as:

| Office | $13B |
|---|---|
| Retail | $6B |
| Industrial | $7B |
| Hotel | $3B |

Further, the commercial property market is multi-tiered. Properties valued at approximately $20M and above have such strongly individual characteristics and sell sufficiently rarely that they are really only amenable to appraisal based methods (which include recent neighbouring sales), whereas an understanding of the dynamics of the market in commercial properties in the sub $20M tier is amenable to a transactions based index approach.

There is a perceived need and opportunity for commercial property derivatives based on transactions prices. A futures market for commercial property could, at least in theory, greatly increase the efficiency of the real estate industry by allowing greater specialization among the various players in the traditional real estate investment business, including investors, developers, property owners, fund managers, mortgage lenders, and others. Index return swaps could address longstanding problems with real estate investment, such as high transactions costs, lack of liquidity, inability to sell "short", and difficulty comparing investment returns with securities such as stocks and bonds.

Hither to repeat sales based index similar to a residential property index has been proposed but has not been commercially implemented.

This specification discloses hedonic, transaction based commercial indices, which are significantly different in both method and construction to repeat sales indices.

Conceptual Framework

A general form of a house price index incorporates three components: current transactions prices, cross-sectional characteristic details and historical prices. This model can be written as $$p_{i,t} = \sum_{t=1}^{T} \left[ D_{i,t}^1 \alpha_t + \sum_{j=1}^{K} X_{i,j,t} \beta_{j,t} + D_{i,t}^2 X_{i,t} \gamma_t \right] + \varepsilon_{i,t} \quad (1.1)$$

where $p_{i,t}$ is the price of house i sold in time t, $D_{i,t}^1$ is a vector of dummy variables for each time period, $X_{i,t}$ is a vector of attribute features for house i at time t, $D_{i,t}^2$ is a vector of dummy variables equal to 1 if property i has sold previously and zero otherwise, $\varepsilon_{i,t}$ is the random noise associated with the sale of house i at time t, and $\alpha_t$, $\beta_t$, and $\gamma_t$ are regression coefficients to be estimated. These parameters represent, respectively, the index value attributable to period t, the implicit value at time t for the k cross-sectional attribute features, and the expected appreciation to properties that have a second sale at time t.

This method is immediately adaptable to modelling price movements in commercial real estate.

The hedonic-regression is a method that attempts to overcome the issue of compositional bias associated with median price measures. The premise for this lies in hedonic theory which suggests that the relative value of a composite good—such as a house—is the sum of its components. Thus, by decomposing the sample of houses into their various structural and location attributes, the differences in these across houses can be controlled.

The term hedonic was first applied to this concept in relation to a similar multivariate regression technique to automobile pricing. Movements in agricultural produce have been modelled via a multiple regression model. An academic application of the hedonic technique to housing was made by in the early 1970's. Virtually simultaneously, the United States Census Bureau constructed the first government-produced hedonic index for housing. However, the hedonic index methodology is only recently becoming increasingly accepted by government bodies, especially statistical agencies, such as the Australian Bureau of Statistics and the German Bureau of Statistics.

Analysis of the hedonic process can be separated into two concepts: the "composition stage" and the "estimation stage."

The methods associated with the composition stage of hedonic index formulation are reviewed first.

The composition stage deals with the approaches to constructing indices from the hedonic function.

The actual specification of the hedonic function is the subject matter of the estimation stage. Consequently, the following discussion assumes a correctly specified hedonic function.

There are two general approaches for composing hedonic indices from the hedonic function:
  i. time dummy variable regressions, and
  ii. index number methods.

The time dummy-variable hedonic regression is the method used in the early hedonic studies. This method estimates a hedonic regression with dummy-variables for each time period. The quality-controlled cumulative growth rate attributable to the time period is then captured by the coefficients of the time dummy variables.

Specifically, the dummy variable regression technique controls for the various characteristics and qualitative features of a property that determine price, using a multivariate pooled regression, in which dummy variables are used to represent the time period of each sale.

This can be represented in the semi-logarithmic form as $$\log P_i(t) = \alpha(t) + \sum_{j=1}^{N} \beta_j X_{i,j} + \sum_{t=1}^{T} \lambda(t)D(t) + \varepsilon_i(t) \quad (1.2)$$

where $P_i(t)$ is the selling price of property i at time t, $\alpha(t)$ is the intercept term, X is a vector of the N hedonic attributes included in the model, $\beta_j$ is the regression coefficient reflecting the implicit price of $j^{th}$ attribute, $\lambda(t)$ estimates the cumulative growth rate to time t, $D(t)$ is a set of dummy variables equal to 1 if the property sold in time-period t and zero otherwise, and $\varepsilon_i(t)$ is the random variation in price of property i at time t unaccounted for by the other terms.

The main advantage to the dummy-variable index over other hedonic index composition techniques is its relatively uncomplicated computation. However, it is also this directness of the model which constitutes the method's main problem. By pooling observations across time periods, the implicit attribute values, or "shadow prices," are held constant. The theoretical structure of the market clearing mechanisms for housing does not suggest that it can be assumed either that at a given market period the relative implicit prices for attributes are the same, or that across market periods the implicit characteristics prices for the same packages of housing services remain constant. This is to be expected since consumer preferences for attributes, designs and locations evolve through time, and the characteristics and amenities of neighbourhoods change.

The stability of attribute values in a pooled hedonic pricing model for residential housing can be tested by comparing coefficient estimates to those achieved from separate time hedonic models. Using comparative F-statistic analysis one finds inconclusive support for the null hypothesis that coefficient values are equal across time periods. This suggests that the implicit prices of attributes are not too divergent through time. However, strong empirical evidence for time-varying asset prices thus the null hypothesis that implicit prices remain constant over time has been rejected. In a study of the underpinning assumption of constant implicit prices in hedonic (and repeat-sales) modelling estimates were compared from a restricted hedonic function to those from a model where slope coefficients can change every year. The results are robust across alternative hedonic specifications using data for two cities in California. Sales data using two time period sub-samples, 1993 to 1998 and 1999 to 2005 from Sydney, Melbourne and Brisbane, supports this finding and rejects the null hypothesis of constant coefficient estimates.

The estimation stage refers to the actual specification of the hedonic function. To achieve efficient unbiased estimates using the hedonic method, it is necessary to correctly specify the regression. In the hedonic literature, this issue of specification is widely acknowledged yet unresolved. This is in part because the appropriate specification of a hedonic function may be data-set specific. In specifying a regression function, three essential components one identified, namely: functional form, choice of variables, and form of the variables.

Functional form refers to the nature of the relationship between the explanatory variables and dependent variable. The hedonic function is typically estimated by ordinary least squares (OLS). This estimation method, however, requires linearity in the parameters. However, an estimated regression function may be non-linear in its variables. Through transformations of variables created by using logarithms, exponentials, reciprocals, transcendental functions, polynomials, products, ratios, and so on, the 'linear' model can be tailored to any number of situations. This array of choice, however, is a mixed blessing. While a seemingly endless combination of functional forms may be used to capture the true relationship between property prices and property characteristics, there is a lack of theory guiding the choice of functional form (or even variables to include) which is a significant problem encountered in hedonic modelling.

Non-linearities in the relationship between house prices and the prices and quantities of housing attributes can be incorporated. The logic behind this derives as a result of the bundling of housing characteristics. The hedonic function can be analysed as the optimal consumption set of packages of characteristics. While a constraint applies to the unbundling of this package of characteristics, the relationship will be non-linear. In other words, housing is a Gestalt good; the whole is potentially worth more than the sum of the parts. Because housing is a tie-in sale of a set of characteristics, (location, if nothing else) the relationship between price and its determining variables is likely to be nonlinear. Empirical hedonic studies typically specify a double-log or semi-log form of hedonic regression. These are motivated by the theoretical advantages outlined above, or the empirical advantage of logarithmic functions of minimising the effect of heteroskedasticity in data. The semi-logarithmic model, in which the dependent variable is transformed as in equation (1.2), is a constant growth model. This is particularly appropriate for time series analysis, since the parameter coefficients reflect the constant growth rate However, the functional form decision is one that needs to be based on empirical results, suggesting that the optimal hedonic specification will vary between different localities. Monte Carlo experiments can be used to determine what specification will be most precise. Empirically, for the same data, it is possible that no functional specification is consistently preferred. This finding creates some doubt as to the appropriateness of restricting data to the same function across time and space.

A non-parametric regression technique can be introduced to the hedonic-regression. This has the advantage of being able to estimate house price indices across regions and time without assuming the same functional form. Specifically, a locally weighted regression uses a function, similar to a moving average, to estimate the regression surface, ideally at every point in the sample. It is a costly and computationally-expensive method. There is another recent non-parametric regression technique, the loess. This method centres the hedonic price function estimates at fixed points, such as the beginning or ending period. This allows for more flexible estimation and is an improved method for controlling for the effect of quality evolution—the change in the overall quality of housing stock—on price movements.

Commercially Available Data Processing and Index-Output Systems

In Australia, there are a number of crude property indices available from both official sources, such as the Australian Bureau of Statistics (ABS), and private providers, such as CBA/HIA, REIA, APM and Residex. These indices vary in quality and coverage.

A brief summary of the different index products provided in Australia is shown below:

| Provider | Index Product |
| --- | --- |
| REIA | Median Price Index |
| CBA/HIA | Median Price Index |
| ABS | Stratified Median Price Index |
| Residex | Repeat Sales Index |
| APM | Stratified Median Price Index |
| IPD | Appraisal Based Commercial Property Price Index |

To date, there is no extant precedent for the following data processing, evaluation, and index-output systems:

There has never been a median price, stratified median price, repeat-sales, hedonic or hybrid index construction systems that has made use of real-time property sales data collection methods that resolve the timeliness issue that afflicts all property indices—ie, an index that relates to property sales reported, for example, in the week prior to the index publication rather than lagged sales that actually occurred 2-3 months ago;

There has never been a 'double adjacent-period' hedonic price index which specifies a direct method of transforming the hedonic inputs, such that the transformations may vary over time. The double adjacent period method allows the production of indicative and fixed values for each period, which are a pre-requisite for a tradable index;

There has never been a "hedonic accumulation index", which combines a hedonic imputation method for estimating rental yields with a hedonic capital gains index to derive a total return (ie. accumulation) index There has never been a property price index specifically designed for derivatives trading, which both Tracks investment returns on a diversified property portfolio Tracks periodic rebalancing of a diversified property portfolio to reflect changing market composition Data processing, evaluation, index-output, and derivative estimation systems Investing in residential and commercial real estate has hitherto been principally limited to the buying and selling of tangible property. This is due to the inherent constraints associated with transacting real estate. These include high transaction costs, market illiquidity, execution delays and the inability to short-sell units of property. The net result of this is that to date property markets, unlike other financial markets, are subject to severe pricing inefficiencies and key stakeholders in the market face a greater risk than players in other markets from the lack of opportunities to hedge their exposure.

Real estate holdings have the risk of downward price movements. This fact can have an adverse effect upon the net worth of many companies and individuals who have significant portions of their assets accounted for by real estate holdings. This includes builders, developers, mortgage insurers and owners of properties.

Another party impacted by downward movements in real estate prices is the banking industry, since the purchase of real estate is typically financed with money borrowed from these institutions. The likelihood of borrower default and the loss in the event of default are both increased in a falling property market. Banks will be adversely affected by borrowers who default on their loan. The only hedging mechanism that is really available to such lenders is financial futures or options contracts based upon interest rates, which are only indirectly associated with, or indicative of, real estate values.

Home-owners, business property direct investors in residential real estate and indirect investors via residential or commercial real estate (being security over loans) would all benefit greatly from financial instruments that would permit them to hedge the risk of their property investment. Indeed, several academics published papers in the early 1990's identifying the need for such hedging instruments, and generally calling for the availability of cash-settled futures or options contracts based upon unspecified indices of real estate prices. This demonstrates a long felt want for such indices.

In addition to providing an effective tool for hedging against tangible residential and commercial real estate investment, derivatives in residential and commercial real estate would enable investors to synthetically invest in real estate. These investors may be interested in diversifying their institutional and individual investment portfolios to include real estate, which is known to have small positive or negative correlations with other financial markets such as equities and bonds. Alternatively, they may be seeking to balance their real estate portfolio by investing in real estate in a separate geographic region to their current investment's location. The current method of investing in real estate requires the actual purchase of the physical piece of property. However, as already described the selling and buying of real estate is an inherently inefficient and expensive process, making it exceedingly difficult for investors to efficiently invest capital in desirable real estate holdings. Furthermore, to truly diversify a real estate investment portfolio, one would need to purchase different types of real estate in many different geographic markets. The costs of executing such a real estate investment strategy, however, would be exorbitant. Moreover, once purchased, such real estate holdings need to be maintained and managed which further increases these costs. Similarly a portion of a specific property cannot be sold, only the entirety of the property.

Derivatives markets are markets for contractual instruments whose performance is determined by how some underlying instrument or asset performs. Derivatives contracts exist between two parties—a buyer and seller—in which each party has certain rights and obligations. Derivatives contracts typically state a price and the terms of agreement. The contracts may be either standardised, as is required for listed derivative contracts, or non-standardised as is permitted in over the counter markets. Non-standardised contracts may be preferable when an investor is looking to gain, or hedge, exposure to a specific aspect of the market. There are various types of derivative contracts: options, forward contracts, futures contracts, swaps and related derivatives.

An option is a contract between a buyer and seller that gives the buyer the right, but not the obligation, to purchase or sell some underlying asset at a later data at a price agreed upon today. The option buyer pays the option seller (or 'writer') a sum of money known as a 'premium.' The option seller is bound to sell or buy according to the contract terms if and when the option buyer so desires. Two categories of options exist: calls and puts. An option to buy some underlying asset is known as a call, while an option to sell some underlying asset is known as a put.

A forward contract is an agreement between a buyer and seller to purchase some underlying asset at a latter date at a price agreed upon today. On the face of it, a forward contract sounds like an option however the two are distinguished by the rights of the respective parties: an option carries the right, but not the obligation to go through with the transaction. If the price of the underlying asset moves such that exercising the option is not as favourable as directly buying or selling in the underlying market, the option holder may decide to forgo buying or selling at a fixed price. On the other hand, the two parties in a forward contract incur the obligation to ultimately buy and sell the underlying asset.

A futures contract is an agreement between a buyer and seller to buy or sell something at a future date. The contract trades on a futures exchange and is subject to a daily settlement procedure. Futures contracts are very similar to forwards, but are standardised and typically developed in liquid markets.

A swap is a contract in which two parties agree to exchange future cashflows. For example, party A may agree to pay to party B a fixed return on some notional amount, while party B agrees to pay to party A a return equal to that of a property index. Alternatively, party A may agree to pay to party B a return equal to the prevailing market interest rate plus or minus a margin on the notional amount.

In 2006, the Chicago Mercantile Exchange launched the first residential real estate futures market for 10 US cities based on the Standard & Poors Case/Shiller repeat-sales residential property indices. Trading volumes have been very thin for a number of reasons relating as follows to the data processing systems and the index construction and design:

The reporting of the property sales used in the Standard & Poors Case/Shiller repeat-sales index are 2-3 months delayed from the actual date of the property sales;

The Standard & Poors Case/Shiller repeat-sales indices are subject to nontrivial historical revisions as new data are added to the index;

The Standard & Poors Case/Shiller repeat-sales indices suffer from numerous biases associated with the use of repeat-sales methodologies, including the following:

Repeat sales indices address the compositional change issue by conditioning on a given house (ie, a given characteristics configuration). However, this may not be enough to entirely eliminate changes in quality of housing from the price index as even a given house changes over time. This is due to the fact that some houses depreciate while other owners improve and renovate their homes. These two competing influences can lead to either deterioration or improvement in the quality of the dwelling over time. In a recent conference on real estate price indices, convened by the OECD and the IMF, the consensus seemed to emerge that the bias in repeat sales price indexes was likely to be in the upward direction. This implicitly reflects the belief that renovations and improvements outweigh the gradual erosion in value due to wear-and-tear;

The repeat-sales model assumes that the quality of the asset is constant through time, which is rarely the case (eg, renovations, depreciation);

Because only properties that transacted more than once are included in the sample, a significant number of observations (eg, up to 80%) are completely discarded;

Within this set of more frequently traded properties there is potential significant sample selectivity bias (eg, apartments or poorer quality properties may trade more or less frequently than detached or better quality homes);

Another drawback of the repeat-sales method is revision volatility, which creates instability in the index. Revision volatility is the tendency for previously estimated index values for prior quarters to change as new data arrives. This is a major drawback for the repeat-sales which relies heavily on data from previous quarters;

A final source of bias is that the repeat-sales approach does not allow for changes in the "implicit" price of particular housing attributes over time. Each property attribute has its own price determined by the demand for and supply of that attribute (eg, number of bathrooms, bedrooms, pools, tennis courts). Moreover, with the repeat-sales method, it is difficult to control for atypical maintenance or capital improvements made during the period between a sale and a resale of a given property. Thus, quality may not be truly held constant when using this technique. In theory, estimation models should test whether attribute coefficients change over time. Yet when one limits the analysis to repeat-sales price data, these tests are not possible.

To date, there is following desirable index-linked derivatives have not been provided or foreshadowed:

An exchange traded property index derivative based on a hedonic or an imputed hedonic data processing and index-output system;

An over-the-counter property index derivative based on ay of an adjacent-period hedonic, imputed hedonic house price data processing and index-output system;

An exchange traded property index derivative based on any of an adjacent-period hedonic, imputed hedonic house price data processing and index-output system which incorporates both capital gain and rental yield information;

An over-the-counter property index derivative based on any of an adjacent-period hedonic, imputed hedonic house price data processing and index-output system which incorporates both capital gain and rental yield information;

An exchange traded property index derivative based on the use of real-time property sales data processing systems that resolve the timeliness issue that afflicts all property indices—ie, an index that relates to property sales reported, for example, in the week prior to the index publication.

BRIEF DESCRIPTION OF THE DRAWINGS

The preferred embodiments of the present invention will be described with reference to the drawings in which.

DATA PROCESSING AND INDEX-OUTPUT SYSTEMS

Figure 1:
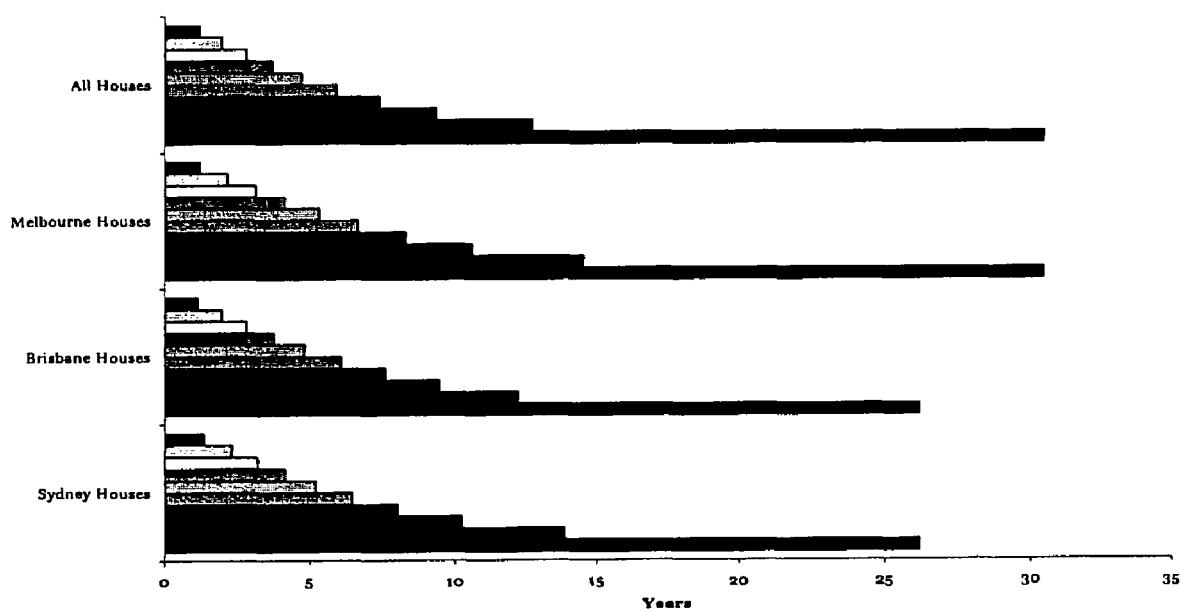
FIG. 1 is a graph illustrating the distribution of housing tenancy in Australia and its major cities.
Figure 2:
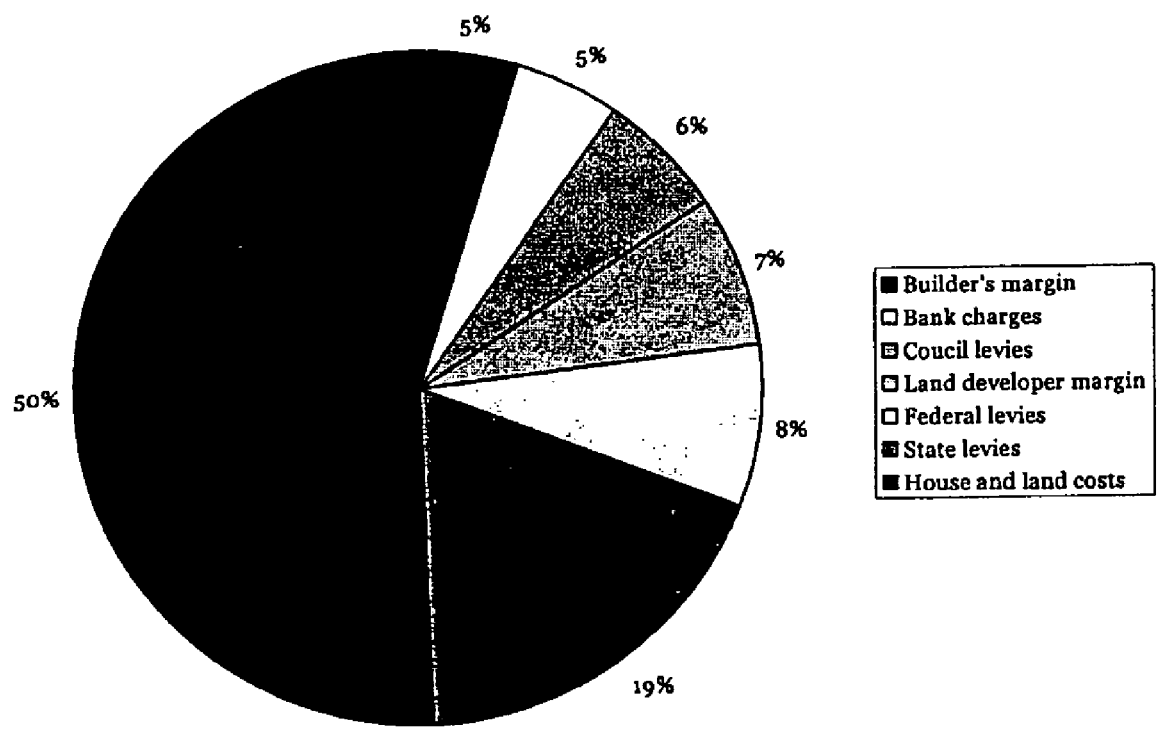
FIG. 2 is a pie chart illustrating the cost of home ownership in Australia.
Figure 3:
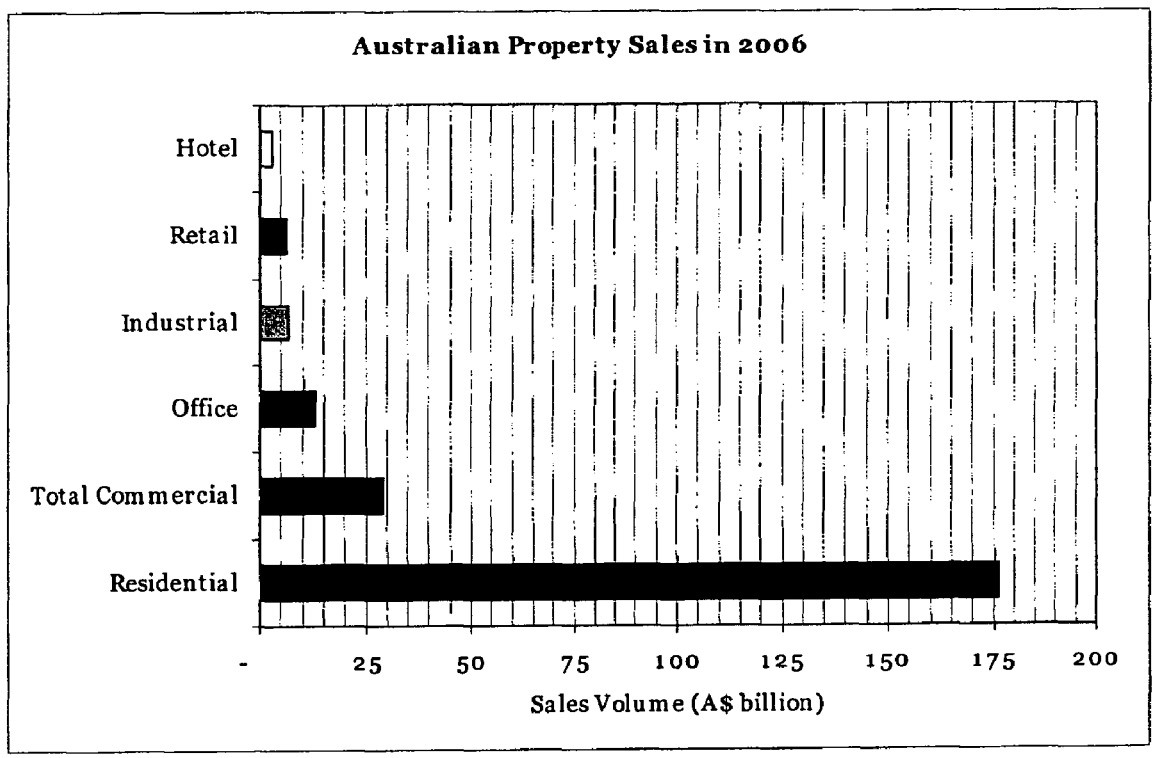
FIG. 3 is a graph illustrating Australian property sales in the year 2006.

In accordance with a first aspect of the present invention there is disclosed a computer implemented data processing, evaluation and index-output system for accurately measuring the real-time risk, return and valuation changes in residential real estate assets over time. In summary, the new data processing index-output systems that have not been disclosed in the prior art are:
1. A double adjacent-period hedonic capital gain price index;
2. A double adjacent-period hedonic accumulation price index;
3. A convexity adjustment to make the indices track the value of a diversified property portfolio.
4. A method of periodically rebasing the indices in order to cater for the dual needs of having the index represent investment returns on a property portfolio, while allowing portfolio rebalancing to track market composition.

It is to be understood that each of the above four (4) data processing index-output systems applies equally to the construction of both residential and commercial property indices.

The adjacent-period approach, attempts to minimise the potentially biasing effect of restricted coefficients in the dummy-variable model. This model is different from the dummy-variable method in that it pools data only from consecutive time periods.

The adjacent period approach is further modified to a triplet of periods, allowing construction of a tradable index, with indicative and final (locked) figures produced each period, to cater for the rate of data flow.

The data are grouped into triplets of consecutive periods. For each of these "double adjacent-period" subsets of data, a hedonic function $$\log P_i(t) = \alpha(t) + \sum_{j=1}^{N} \beta_j f_j(X_{i,j}) + \sum_{t=1}^{T} \lambda(t) D(t) + \varepsilon_i(t) \quad (1.3)$$

similar to that used in the dummy variable model is estimated, with two significant modifications:

1. Only two time dummy variables, corresponding to the second and third time periods of the pair, are included.
2. The attribute values $X_j$ are transformed by continuous, piecewise linear functions $f_j$ prior to finding the coefficients $\beta_j$ via multi-linear regression. The transformation functions $f_j$ are found via a recursive inclusion procedure prior to the application of the final statistical regression.

Using a logarithmic hedonic function, the coefficients of the two time dummy variables then yield the one period logarithmic growth rates from period 1 to period 2 and from period 2 to period 3 in the subset.

The coefficients $\beta_j$ and transformations $f_j$ are constant in the model over each "double adjacent period" ie. each triplet of periods. In reality, $\beta_j$ and $f_j$ vary slowly over time, so that fitting a hedonic model over many periods simultaneously causes errors in the parameter estimates. The adjacent-period technique thus minimises the restriction on coefficient values and transformation functions.

The relationship between land size and sale price was found to be a power law ie. Log (sale price) is linear in log (land size).

The other input variables eg. number of bedrooms & number of bathrooms (in the case of residential property), whose relationship to the output logarithmic price is non-linear, are regressed singly as dummy variables against the log prices to obtain the input transformation functions discussed above.

The full hedonic input function is then assembled and regressed (distinctly for each triplet of periods) against the log prices to obtain the index growth rates. A mean squared error estimation method is used to determine the convexity adjustment in Point 3 above.

Input variables from the candidate list are retained in the final hedonic functional form if their coefficients $\beta_j$ are statistically significantly different from zero and of the correct sign.

The method is first applied to sales data in order to:

1. Calculate a capital gains index which allows the relative contributions of the attributes to vary with each time period, and
2. Impute values to each property in the population for which a sale was not observed during the period.

The method is next applied to rental data in order to obtain a rental imputation formula for all properties. This formula is then used to calculate cumulative rental income for each property and add it to the sales values, thus obtaining an "accumulation index", similar in concept to the "accumulation index" on stock exchanges, which adds dividend payments stock prices charges.

DETAILED DESCRIPTION OF THE PREFERRED EMBODIMENTS

Capital Gains Index

Given hedonic variables $X_1, \ldots, X_n$, a double adjacent period hedonic formula, is used, applied to property sales $P_i$ in each triplet of periods $(T_{k-2}, T_{k-1}, T_k)$:

$$\log P_i = \quad (2.1)$$
$$c_0(T_k) + \sum_{j=1}^{m} s_j(T_k) S_j + \sum_{j=1}^{n} c_j(T_k) f_j(x_j) + \lambda_1(T_k)\tau_1 + \lambda_2(T_k)\tau_2 + \varepsilon_k$$

where:
- The $f_j$ are transformations of the hedonic variables.
- The $c_j$ are time varying numerical coefficients.
- The $S_j$ are dummy variables with $S_j=1$ if property i is in suburb j.
- The $s_j$ are time varying numerical coefficients of the suburb dummy variables.
- $\tau_1$ is a dummy variable with $\tau_1=1$ if the sale occurred in period $T_{k-1}$ and $\tau_1=0$ otherwise.
- $\tau_2$ is a dummy variable with $\tau_2=1$ if the sale occurred in period $T_k$ and $\tau_2=0$ otherwise.
- $\varepsilon_k$ is the (zero mean) residual error term The above hedonic model thus gives the best estimate of the log return on a property, controlling for its most statistically significant, objectively observable price determining attributes.

The coefficients $\lambda_1, \lambda_2$ give the hedonic index log returns over the respective periods $(T_{k-2}, T_{k-1})$ and $(T_{k-1}, T_k)$. That is, if H(T) is the index value at time T, then $$H(T_{k-1}) = \exp\{\lambda_1(T_k) + \sigma_1(T_k)^2/2\} H(T_{k-2}) \quad (2.2)$$

$$\hat{H}(T_k) = \exp\{\lambda_2(T_k) - \lambda_1(T_k) + \sigma_2(T_k)^2 2\} H(T_{k-1}) \quad (2.3)$$

where $\sigma_1(T_k), \sigma_2(T_k)$ are respectively the standard error of $\lambda_1(T_k), \lambda_2(T_k)$. These are adjustment terms to make the index track returns on a portfolio.

The value $H(T_{k-1})$ is the final figure for the period $(T_{k-2}, T_{k-1})$ and $\hat{H}(T_k)$ is the indicative figure for the period $(T_{k-1}, T_k)$. Note that both these index numbers are actually calculated at the time $T_{k+1}$.

The hedonic index thus obtained is a capital gain index.

The average return on the hedonic property index over a period $[t_0, t]$ is therefore an estimate of the average return on a diversified property portfolio over $[t_0, t]$.

The transformations $f_j$ are determined in the following manner:

Let input variable 1 be land size, with $c_1$ its coefficient and $f_1$ its transformation.

The objective function $$\log P_i = c_0(T_k) + \sum_{j=1}^{m} s_j(T_k) S_j + c_1(T_k) f_1(x_1) + \quad (2.4)$$
$$\lambda_1(T_k)\tau_1 + \lambda_2(T_k)\tau_2 + \varepsilon_k$$

is used to begin.

That is, landsize and suburb only are regressed against log of observed price.

Various functional forms of $f_1$ have been tested, with the best ie. the one which minimises the standard deviation of the error $\varepsilon_k$ found to be $f_1(x) = \log x$.

For each of the input variables i with a non-binary domain, let the range of observable values be $x_{i,1}, \ldots, x_{i,n_i}$. For $j=1, \ldots, n_i$, let $\chi_{i,j}$ be a dummy variable with $\chi_{i,j}=1$ if $X_i = x_{i,j}$.

For each $i>1$, determine the coefficients $\gamma_{i,j}$ in the regression:

$$\log P_i = c_0(T_k) + \sum_{j=1}^{m} s_j(T_k) S_j + c_1(T_k) f_1(x_1) + \quad (2.5)$$
$$\sum_{j=1}^{n_i} \gamma_{i,j}(T_k) \chi_{i,j} + \lambda_1(T_k)\tau_1 + \lambda_2(T_k)\tau_2 + \varepsilon_k$$

Each transformation function $f_i$, $i>1$ is then completely defined by $f_i(x_{i,j}) = \gamma_{i,j} = \gamma_{i,j}$.

Thus, each transformation $f_i$, $i>1$ is determined by regressing suburb and log (landsize) with dummy variables describing the possible values of the input $X_i$ against log of observed price, one input variable $X_i$ at a time.

Accumulation Index

Imputation of Rents

For a property which sells for a price $P_1$ at time $T_1$, all imputed rental income for that property from a base period $T_0$ to the time $T_1$ is added to $P_1$ to obtain an accumulation price $\tilde{P}_1$.

The accumulation prices are then regressed against time dummy variables and the same hedonic variables as in the capital gain hedonic index calculation (2.1) to obtain an accumulation index which estimates capital gain+gross rental yield.

Using (2.1) with suburb included, given hedonic variable values $x_1, \ldots, x_n$ for a property, the hedonic formula gives an estimate of any property price in any time period $T_k$:

$$\log P(T_k) = c_0^P(T_k) + \sum_{j=1}^{n} c_j^P(T_k) f_j(x_j) + \varepsilon_k^P \quad (2.6)$$

Similarly, a hedonic formula can be derived which uses the same transformations, but different coefficients to give an estimate of the rent for the period on any property in any time period $T_k$:

$$\log R(T_k) = c_0^R(T_k) + \sum_{j=1}^{n} c_j^R(T_k) f_j(x_j) + \varepsilon_k^R \quad (2.7)$$

Establish a base period $T_0$.

For a property selling in period $T_k$, we have the observed price $P(T_k)$ which was used to calculate the hedonic estimate in (2.6) and, given the state vector $(x_1, \ldots, x_n)$, the imputed rents $\hat{R}(T_1), \ldots, \hat{R}(T_k)$, obtained from (2.7):

$$\hat{R}(T_k) = E[R(T_k) | \mathfrak{I}_k] = \exp\left\{c_0^R(T_k) + \sum_{j=1}^{n} c_j^R(T_k) f_j(x_j) + (\sigma_k^R)^2/2\right\} \quad (2.8)$$

where $\sigma_k^R$ is the standard deviation of the residual error $\epsilon_k^R$.

The accumulation price is defined as follows:

$$\tilde{P}(T_k) = P(T_k) + \sum_{i=1}^{k} \hat{R}(T_i) \qquad (2.9)$$

The same hedonic variables $X_1, \ldots, X_n$ are then regressed as in the capital gain index against the accumulation prices $\tilde{P}(T_k)$, using the time dummy method in equations (2.1)-(2.3) to obtain a hedonic accumulation index which includes the imputed rents on a property by property basis.

Average Yield from Imputed Property Values

A fallback method to the accumulation price method for the hedonic accumulation index is required in situations where the errors in the estimation of the coefficients in the hedonic capital gains and accumulation indices are too large.

In such cases, an average rental yield is calculated from observed rents and imputed property values. Then this rental yield is added to the hedonic capital gains index return series to obtain the hedonic accumulation index return series and hence the hedonic accumulation index itself.

In a given period $T_k$, we will receive rental data for a sample of $N_k$ properties. For each property in the sample, the hedonic state vector $(X_1, \ldots, X_n)$ is used to input a price via equation (2.6):

$$\hat{P}(T_k) = \qquad (2.10)$$

$$E[P(T_k) \mid \mathfrak{I}_k] = \exp\left\{c_0^P(T_k) + \sum_{j=1}^{n} c_j^P(T_k) f_j(x_j) + (\sigma_k^P)^2/2\right\}$$

The estimated mean rental yield for the period is calculated as follows:

$$y(T_k) = \sum_{i=1}^{N_k} R_i(T_k) \bigg/ \sum_{i=1}^{N_k} \hat{P}_i(T_k) \qquad (2.11)$$

If H(T) is the capital gain index, the accumulation index is calculated as $$\tilde{H}(T_{k+1}) = \tilde{H}(T_k)(H(T_{k+1})/H(T_k) + y(T_{k+1})) \qquad (2.12).$$

Method of Basing the Indices

An index has two purposes:
1. To accurately represent changes in value in the market between periods.
2. To accurately represent absolute market prices.

To achieve the first objective, the index must be able to be used to calculate the change in value of a representative market portfolio whose composition is held constant over a given time interval. This is the purpose of the hedonic formula (2.1).

To achieve the second objective, the index value must be set equal to an appropriate statistic of the distribution of values in the market eg. the median or mean.

These goals are conflicting because the first requires the representative portfolio to be held constant over the given period, whereas the second requires the representative portfolio to be regularly adjusted to match market composition. For example, if the percentage of 3 bedroom houses in the overall market increases, the percentage of 3 bedroom houses in the index calculation must correspondingly increase.

In order for a single property index series to achieve both the goals, it must be rebased at a regular set time intervals.

Specifically, suppose the index is calculated at times $T_1, T_2, T_3, \ldots$. Suppose rebasing occurs every k'th period ie. at $T_k, T_{2k}, T_{3k}, \ldots$.

For any given geographical region and dwelling type (eg houses/home units/outside Australia termed condominiums), we describe two methods for calculating the base index figures are described:
1. The base figure is calculated as the median of the distribution of the imputed prices in the given time period of all properties in the segment, measured in $000.

Explicitly, given a geographical region and dwelling type, the hedonic method applied to a single period $T_k$:

$$\log P(T_k) = c_0(T_k) + \sum_{j=1}^{n} c_j(T_k) f_j(x_j) + \varepsilon_k \qquad (2.13)$$

gives us an estimate of the value of any property with hedonic attributes $x_1, \ldots, x_n$ at time $T_k$:

$$\hat{P}(T_k) = E[P(T_k) \mid \mathfrak{I}_k] = \exp\left\{c_0(T_k) + \sum_{j=1}^{n} c_j(T_k) f_j(x_j) + \sigma_k^2/2\right\} \qquad (2.14)$$

where $\sigma_k^2$ is the variance of $\epsilon_k$.

The index value for the base period is then chosen as the median of the distribution of all imputed prices $\hat{P}(T_k)$ in the period, obtained from (2.14).

2. An alternative method for calculating the base value figure is to:
   a. Extract from the imputation formula in (2.13) the coefficient $c_{sub}$ of the suburb dummy variable for each observed sale.
   b. The suburbs may then be ranked according to increasing $c_{sub}$ value.
   c. The suburbs are grouped via their ranking into N strata each as nearly equal as possible populations.
   d. The median of observed sales in each stratum is calculated: $m_1, \ldots, m_N$.
   e. The base figure is the geometric mean $$\sqrt[N]{m_1 \ldots m_N}.$$

Method 2 above is used in the event that either:
   The coefficient estimates in (2.13) have excessively large confidence intervals, rendering the estimation of the distribution of values via (2.14) inaccurate.
   The distribution of hedonic attributes of the dwelling stock which existed during the basing period is unavailable. This is currently the case prior to the 1990's.

Derivatives

Six (6) classes of property derivative contracts are described whose cash flows depend directly on, and are calculated directly from, a hedonic (including hedonic based imputation) property index:
1. A forward or futures contract over a hedonic property index.

2. A property return swap whose income stream depends on the values of a hedonic property index.
3. A note whose capital value and income stream depends on the values of hedonic property indices.
4. A call or put option contract over a hedonic property index.
5. A cap, floor or collar over a hedonic property index.
6. An option to buy or sell at a later date a property return swap whose income stream depends on the values of a hedonic property index.

1. Forward Contracts

Forward and futures contracts will pay out the notional value of the contract times the difference between the level of the underlying hedonic price index as at the contract settlement date and the contract's strike index level. This payout mechanism can be written as $$\text{Payout}(T)=\text{Notional Principal}*(\text{Index}(T)-\text{Strike})$$

where T is the contract settlement date. The strike or delivery price is set when a contract is initiated. It is the expected value of the underlying index at the contract expiry date.

The notional value of a contract is effectively the dollar sensitivity of the trade to a one point change in the relevant index value; bullish (long) trades will have a positive notional amount; bearish (short) trades will have a negative notional amount.

A subcategory of forward contracts is contracts for difference (CFDs).

2. Property Return Swaps

Swaps in general involve two counterparties exchanging one set of cash flows for another. It is usual for the two sets of cash flows to be derived from two different assets or groups of assets.

The payer or seller in a property return swap agrees to pay to the counterparty (the receiver or buyer) the percentage index return ie. change in the index over the time period times a notional principal amount. The swap will usually be structured into multiple, equal time periods, with payments at the end of each.

In return, the receiver or buyer pays to the seller the percentage return on another asset (or possibly an agreed fixed rate) times the notional principal amount.

In practice, there is a netting agreement, so that physical payments are only one way in each period.

Suppose P is the notional principal, the contract commences at time $t_0$ and the payments are made at times $t_1, \ldots, t_n$.

At time $t_k$, the payer or seller pays an amount $P(I(t_k)/I(t_{k-1})-1)$, where $I(t)$ is the property index value.

At time $t_k$, the receiver or buyer either:
Pays an amount $P(A(t_k)/A(t_{k-1})-1)$, where $A(t)$ is the buyer's reference asset value.
Pays an amount $P(f(t_k-t_{k-1}))$, where $f$ is the agreed fixed rate per annum.

The property index used can be either a capital gain index, an accumulation index, or a combination of both eg. an average.

3. Property Index Notes

Index-linked notes are issued by major broker-dealers via a AA-rated (or higher) entity. The repayment of principal and interest are backed by the full faith and credit of the issuing firm.

The note pays a coupon (regular interest-like payment) which is derived from the then current values of the capital gains and accumulation indices, thus simulating a rental yield. The note is redeemable at expiry for the then current value of the capital gains index. The principle is that a note over a specific index synthesises returns on a diversified portfolio of property of the type and in the region covered by the index, by making payments which depend on the calculated values of the index.

For example, Brisbane house notes will pay a return derived from the values of the Brisbane house capital gains and accumulation indices.

Suppose the note makes payments which are returns on the underlying principal P, is the notional principal, the contract commences at time $t_0$ and the payments are made at times $t_1, \ldots, t_n$, where $t_n$ is the expiry date of the note.

If the note originally sells for a price P, it is redeemable for $P(C(t_n)/C(t_0)-f(t_n-t_0))$ or $P(1-f)C(t_n)/C(t_0)$, where $C(t)$ is the value of the capital gains index and $f$ is a fee to cover management costs of the issuer.

If $A(t)$ is the value of the accumulation index, define the implied gross rental yield over the period $[t_{k-1},t_k]$ as $y_k=A(t_k)/A(t_{k-1})-C(t_k)/C(t_{k-1})$.

The property index note pays a coupon $K(t_k)$ at $t_k$ equal to a multiple of the gross rental yield: $K(t_k)=kPy_k$, where k is a constant multiple.

4. Calls & Puts

A call option over a property index is the right to buy the index at the contractually defined strike or delivery price on or before the option contract expiry date.

Suppose P is the notional principal, the delivery price is K and the contract expires at time T.

For what is commonly known as a European option, the option can only be exercised at time T. For what is commonly known as an American option, the option can be exercised at any time up to and including T.

If t is the actual exercise time, the seller pays an amount $P(I(t)-K)^+$, where $I(t)$ is the property index value at time t and the value of $(I-K)^+$ is I-K if I>K and 0 otherwise.

A put option over a property index is the right to sell the index at the contractually defined strike or delivery price on or before the option contract expiry date.

If t is the actual exercise time, the seller pays an amount $P(K-I(t))^+$, where $I(t)$ is the property index value at time t.

Call or put options are thus forward contracts where the holder or buyer is not legally required to settle: they can simply allow the contract to expire if settling would create an unfavourable outcome.

Because the underlying asset is the index, the contracts are purely synthetic. It is therefore not possible for the seller to settle the contract by providing the underlying asset. Thus, all property index call and put option contracts are settled in cash.

Variants to the standard payout of $P(I(t)-K)^+$ for calls and $P(K-I(t))^+$ for puts:
Instead of the final index figure $I(t)$ at the exercise date t, substitute an arbitrary function of the index over a set of times $t_1, \ldots, t_n \leq t$. For example, a call option might pay out on the average value of the index: $P((I(t_1)+I(t_2)+ \ldots +I(t_n))/n-K)^+$.
Instead of the fixed delivery price K, substitute an arbitrary function of the index over a set of times $t_1, \ldots, t_n \leq t$. For example, the delivery price of a call might be the minimum value of the index over a set of times, so the payout is: $P(I(t_n)-\min(I(t_1), I(t_2), \ldots, I(t_n)))$.

5. Caps, Floors & Collars

A cap over a property index is a property return swap over that index, where the return in any given period payable by the seller is capped at an agreed maximum value.

Thus, if this agreed maximum period return is M, at each time $t_k$, the payer or seller pays an amount $P*\min(I(t_k)/I(t_{k-1})-1,M)$, where $I(t)$ is the property index value.

A floor over a property index is a property return swap over that index, where the return in any given period payable by the seller is guaranteed to be an agreed minimum value (often 0).

Thus, if this agreed maximum period return is m, at each time $t_k$, the payer or seller pays an amount $P*\max(I(t_k)/I(t_{k-1})-1,m)$, where I(t) is the property index value.

A property collar is a property return swap with a cap and a floor: the payer pays returns on the index, at least an agreed minimum, but at most an agreed maximum.

Caps, floors and collars are settled in cash at the end of each payment period.

6. Swaptions

A call swaption is the option to be the buyer in a property return swap at an agreed price. That is, a call swaption with expiry date T and delivery price K entitles the holder to enter into a property return swap which commences upon exercise of the option at a time $t \leq T$. If the holder exercises the swaption, they will receive property returns on the notional principal over the specified index for the specified period and in return pay the fixed return K on the notional principal.

A put swaption is the option to be the seller in a property return swap at an agreed price. That is, a put swaption with expiry date T and delivery price K entitles the holder to enter into a property return swap which commences upon exercise of the option at a time $t \leq T$. If the holder exercises the swaption, they will pay property returns on the notional principal over the specified index for the specified period and in return receive the fixed return K on the notional principal. Variants are call and put swaptions over caps, floors and collars.

Example Housing Index

1. Data

For the purpose of this worked example, 56 observations of house sales are drawn from the Sydney suburbs of Balmain, Leichhardt, and Paddington over the period 1 Mar. 2007 to 30 Jun. 2007. This enables a demonstration of the index estimation process from one period to the next.

When broken into the two distinct triple-month time periods necessary for the index calculation in Equation 2.1, it can be seen that the first grouping—March, April, May—has 46 sales observations, whereas the second grouping—April, May, June—has 35. While roughly comparable, such variation is to be expected with the seasonality of the housing market. In this example, it would be reasonable to conclude that there are less sales in June than in March as the Sydney housing market moves into the slower winter months. This change in volumes, however, is also reflective of the timeliness issue associated with housing data, and supports the use of "Indicative" index figures, which are later adjusted to a "Final" value.

For each sales record, the sale price and date are recorded as well as detailed hedonic attribute data comprising the total property landsize, number of bedrooms, bathrooms and carspaces, and the presence of a scenic view, a pool, waterfrontage, and air-conditioning. In this example, these variables represent the $X_n$ hedonic variables in Equation 2.1. Details of this data are provided in Table 1. An observation ID has been assigned to each sales record in this example, to enable easy cross-referencing through each step.

2. Deriving Transformations

In order to estimate Equation 2.1, the necessary transformations of the hedonic variables, $f_j$, must first be derived. As discussed in the text, the optimal transformation for the land-size variable is found to be $f_1(x)=\log x$. Transformations for the variables bedrooms, bathrooms, and carspaces, are obtained by estimating Equation 2.5. This regression requires log(Sale Price) as the dependent variable, the transformed land-size variable, log(land-size), dummy variables for the suburb location and dummy variables for the range of possible values of the respective hedonic Xi variables. The layout of this data is presented in Table 2.

In this example, the ranges of the non-binary hedonic variables is: Bedrooms [2,3,4]; Bathrooms[1,2,3]; and, Carspaces[0,1,2]. In order to avoid the "dummy variable trap," the coefficient of one value of each variable is restricted to zero. In this example, it is Bedrooms=3; Bathrooms=2; and, Carspaces=1. Similarly, the coefficient of the Balmain suburb is restricted to zero. The choice as to which value to restrict does not affect the outcome: the estimated coefficients on the other values comes to represent its value relative to the restricted variable.

3. Transformations

The results of estimating Equation 2.5 on the data presented in Table 2 are presented in Tables 3A, 3B, and 3C.

The $R^2$ of all these regressions are reasonably high (lowest=0.73; highest=0.85), reflecting the ability of land-size and location to explain a high proportion of variability in prices. The estimated coefficients have the expected signs, and for the most part are estimated with a high degree of statistical significance. Given these results are derived for a small random sample of the total population of sales, it is likely that the fit and significance of the model is in fact much stronger than presented here.

Taking the averages in the estimated coefficients for each possible value of input Xi over the two triplet-month periods, yields the transformations summarized in Table 3D below. These results support a priori expectations that: (a) there is value in every additional bedrooms, bathrooms, or carspace; and (b) the incremental value of each additional attribute is not linear. This result supports the use of transformations when analysing this data.

4. Transformed Data

Having obtained the transformations for all non-binary variables—in this example, bedrooms, bathrooms, and carspaces—the observed hedonic attribute values are replaced by their transformations. For example, sales observation 1 had three bedrooms; the transformed bedrooms variable for observation 1 is now 0. Similarly, sale price and land-size have been substituted with their respective logs. The binary attribute variables—waterfrontage, view, pool, air-conditioning—as well as suburb have been replaced with dummy variables equal to 1 in the presence of the variable (or locality, in the case of suburbs), and 0 otherwise. The suburb Balmain is not included, as in the transformation regressions (section 2), to ensure full-rank in the regression matrix.

The layout of the data given this transformation is presented in Table 4. This is now the final data format for fitting Equation 2.1: the hedonic index estimation.

5. Hedonic Regression

The results from fitting Equation 2.1 to the transformed data presented in the previous section for each of the triple-month periods are set out in Table 5. Again, the models show a high degree of fit by the $R^2$ statistic, and generally the coefficient estimates have the expected sign and magnitude. Since these numbers are drawn from a small sample, however, little weight should be applied to their meaning; these numbers are designed to illustrate the index process.

The results of interest are the estimated on the time dummy variables: the $\lambda_{ji}$. These represent the estimated monthly index growth rate. The next section outlines how these numbers are adjusted to correct from bias arising from the logarithmic transformation of the function, with the final section demonstrating how an index is then formed from these estimates via a chain-linking process.

6. Bias Correction

To make the index track the returns on a portfolio, the lamda estimates must be adjusted for bias induced by the logarithmic transformation of the regression function. The formula for this correction is set out inside the brackets in Equations 2.2 and 2.3. The results from the regression of Equation 2.1 and the subsequent corrected lamda results are presented in Table 6 below.

7. Index Calculation

This final section demonstrates the chain-linking process by which the bias-corrected lamda estimates form the hedonic house price index.

Figure 4:
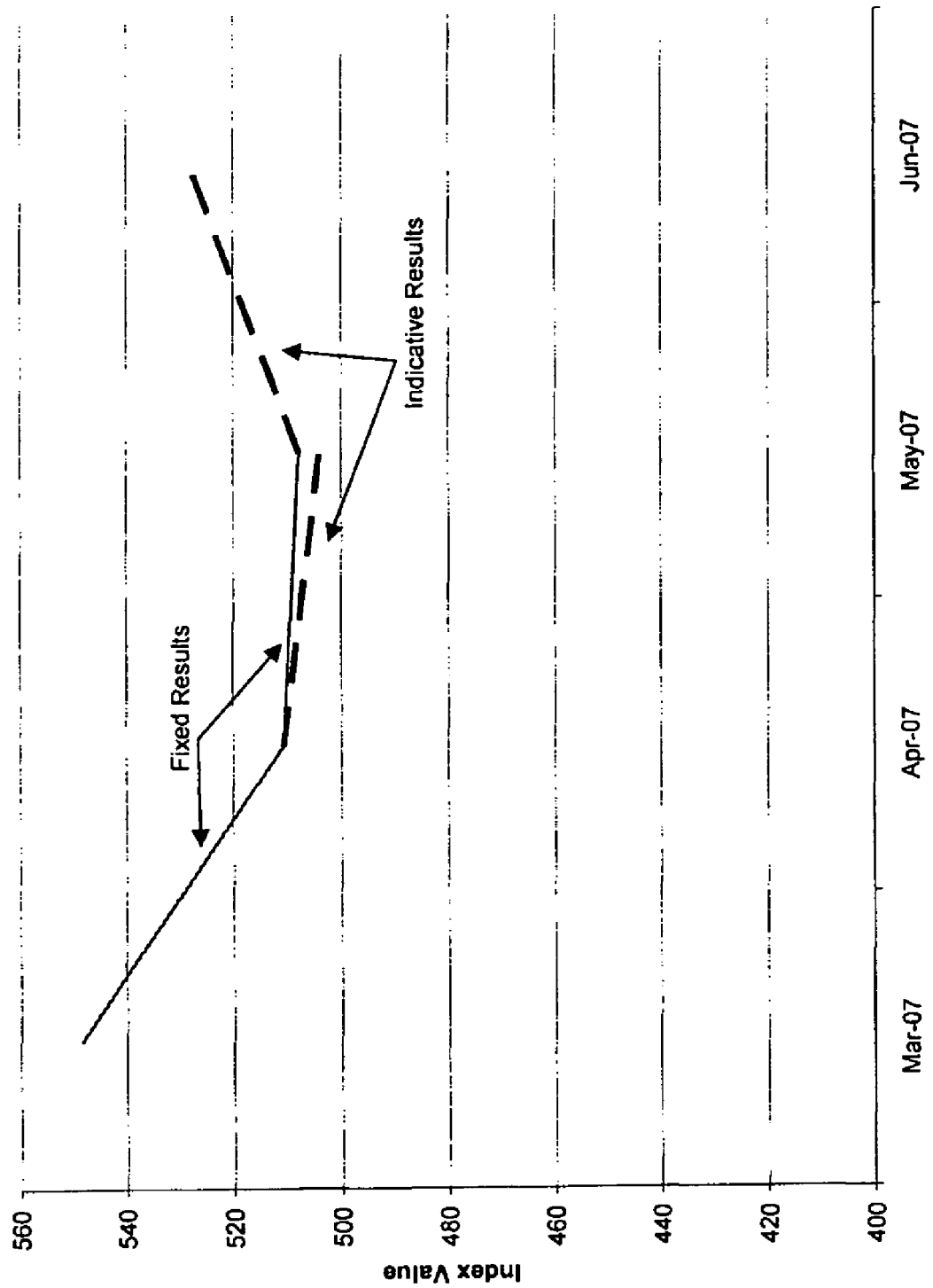
FIG. 4 is a graph of the estimated hedonic house price index of the example.

A base value is required. For the purpose of this example, the actual value of the RP Data-Rismark Sydney House Price Index as at March-2007, 548.289 is used. For the first triple-month period, T=1, Equation 2.2 gives the April 2007 value, and Equation 2.3 gives the May-2007 value. Similarly, for the second triple-month time period, Equations 2.2 and 2.3 yield the index results as at May-2007 and June-2007, respectively. For the purpose of the trading index, the latest month in each tri-month period is "Indicative." Each subsequent month, the previous "Indicative" estimate is revised to a final, or "Fixed," value. The estimated index is presented below in Table 7, and charted in FIG. 4. The plotted index shows the movement in aggregate property prices as well as the updating of indicative index value to fixed values.

Figure 5:
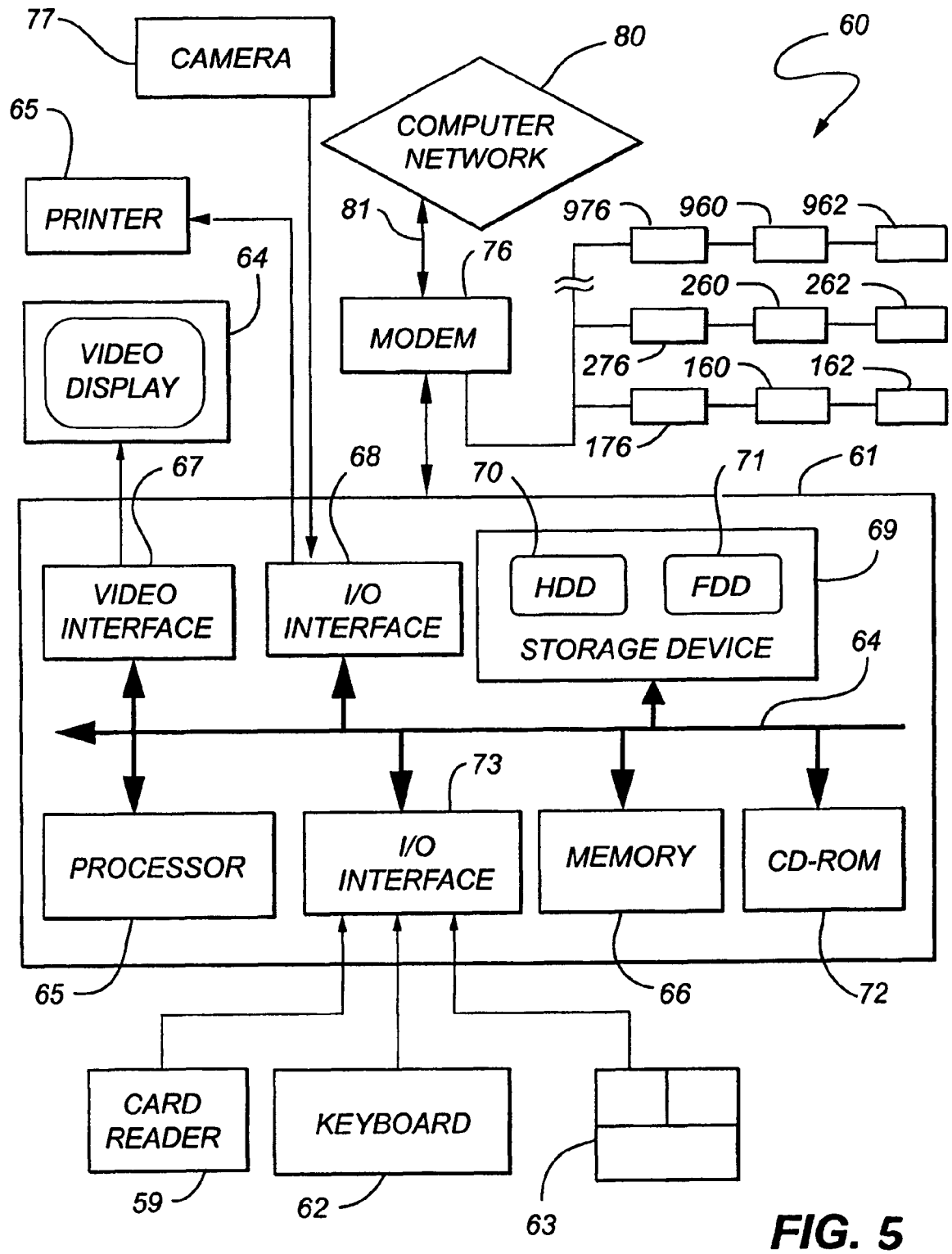
FIG. 5 is a block diagram of a computer system on which embodiments of the present invention can be implemented.

The methods and processes described above are preferably practised using a conventional general-purpose computer system 60, such as that shown FIG. 5 wherein the processes are implemented as software, such as an application program executed within the computer system 60. In particular, the steps of the processes are effected by instructions in the software that are carried out by the computer. The software can be divided into two separate parts; one part for carrying out the specific processes; and another part to manage the user interface between the latter and the user. The software is able to be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer results in an advantageous apparatus for carrying out embodiments of the invention.

The computer system 60 comprises a computer module 61, input devices such as a keyboard 62 and mouse 63, output devices including a printer 65 and a display device 64. A Modulator-Demodulator (Modem) transceiver 76 is used by the computer module 61 for communicating to and from a communications network 80, for example connectable via a telephone line 81 or other functional medium. The modem 76 can be used to obtain access to the Internet, and other network systems, such as a Local Area Network (LAN) or a Wide Area Network (WAN) or other computers 160, 260, . . . 960, etc each with their own corresponding modem 176, 276, . . . 976, etc and each having a data input terminal 162, 262, . . . 962, etc. Each of the computers 160-960 are used to collect data for the preparation of an index, for example.

The computer module 61 typically includes at least one processor unit 65, a memory unit 66, for example formed from semiconductor random access memory (RAM) and read only memory (ROM). There are input/output (I/O) interfaces including a video interface 67, and an I/O interface 73 for the keyboard 62, mouse 63 and optionally a card reader 59, and a further interface 68 for the printer 65 or optionally a camera 77. A storage device 69 is provided and typically includes a hard disk drive 70 and a floppy disk drive 71. A magnetic tape drive (not illustrated) can also be used. A CD-ROM drive 72 is typically provided as a non-volatile source of data. The components 65 to 73 of the computer module 61, typically communicate via an interconnected bus 64 and in a manner which results in a conventional mode of operation of the computer system 60 known to those in the relevant art. Examples of computers on which the embodiments can be practiced include IBM-PC's and compatibles, Sun Sparcstations or alike computer systems evolved therefrom.

Typically, the application program of the preferred embodiment is resident on the hard disk drive 70 and read and controlled in its execution by the processor 65. Intermediate storage of the program and any data from the network 80 is accomplished using the semiconductor memory 66, possibly in concert with the hard disk drive 70. In some instances, the application program is encoded on a CD-ROM or floppy disk and read via the corresponding drive 72 or 71, or alternatively is read from the network 80 via the modem device 76. Still further, the software can also be loaded into the computer system 60 from other computer readable media including magnetic tape, a ROM or integrated circuit, a magneto-optical disk, a radio or infra-red transmission channel between the computer module 61 and another device, a computer readable card such as a PCMCIA card, and the Internet and Intranets including email transmissions and information recorded on websites and the like. The foregoing is merely exemplary of relevant computer readable media. Other computer readable media may be practiced without departing from the scope and spirit of the invention.

Figure 6:
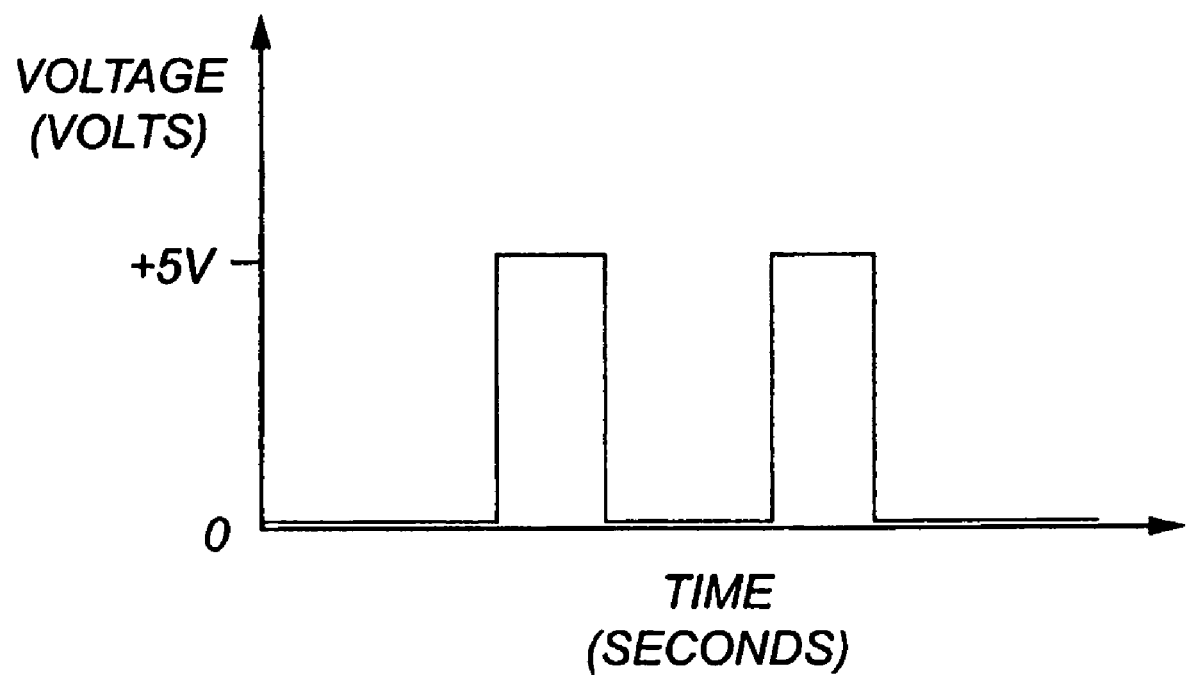
FIG. 6 is a representation of a digitally encoded electric waveform.

It should not be lost sight of that the purpose of the computer system 60 is to generate a digitally encoded electric signal (such as that illustrated in FIG. 6) which when applied to an output interface (such as the display device 64 or the printer 65) produces an indicium or indicia which convey information and which are legible or intelligible to a human. For example, the electric signal illustrated in FIG. 6 is a binary encoded signal 01001 which when applied to the display device 64 or printer 65 causes the indicium 9 to be displayed or printed.

The processes can alternatively be implemented in dedicated hardware such as one or more integrated circuits performing the functions or sub functions of the processes. Such dedicated hardware can include graphic processors, digital signal processors, or one or more microprocessors and associated memories.

The foregoing describes only some embodiments of the present invention and modifications, obvious to those skilled in the financial and computing arts, can be made thereto without departing from the scope of the present invention.

The term "comprising" (and its grammatical variations) as used herein is used in the inclusive sense of "including" or "having" and not in the exclusive sense of "consisting only of".

TABLE 1

Data

This table provides details of the sales observations used in the worked example. There are 56 house sales used with the following sales and attribute detail: sale price and date, suburb, and total property landsize; the number of bedrooms, bathrooms and carspaces; and the presence of a scenic view, a pool, waterfrontage, and air-conditioning.

| Observation ID | Sale Price | Sale Date | Landsize (ha) | Bedrooms | Bathrooms | Carspaces | Scenic View | Pool | Waterfront | Air-Con | Suburb |
|---|---|---|---|---|---|---|---|---|---|---|---|
| 1 | 1,105,000 | Mar. 1, 2007 | 0.0196 | 3 | 2 | 0 | No | No | No | No | BALMAIN |
| 2 | 705,000 | Mar. 2, 2007 | 0.0181 | 2 | 1 | 0 | No | No | No | No | BALMAIN |
| 3 | 708,000 | Mar. 3, 2007 | 0.0143 | 3 | 1 | 0 | No | No | No | No | LEICHHARDT |
| 4 | 725,000 | Mar. 3, 2007 | 0.0205 | 2 | 1 | 0 | No | No | No | No | LEICHHARDT |
| 5 | 863,000 | Mar. 6, 2007 | 0.0186 | 4 | 1 | 0 | No | No | No | No | LEICHHARDT |
| 6 | 765,000 | Mar. 7, 2007 | 0.0149 | 2 | 1 | 0 | No | No | No | No | BALMAIN |
| 7 | 1,060,000 | Mar. 7, 2007 | 0.0181 | 3 | 1 | 1 | No | No | No | No | PADDINGTON |
| 8 | 873,000 | Mar. 13, 2007 | 0.0131 | 2 | 1 | 0 | No | No | No | No | BALMAIN |
| 9 | 860,000 | Mar. 13, 2007 | 0.0197 | 3 | 2 | 2 | No | No | No | No | LEICHHARDT |
| 10 | 1,100,000 | Mar. 14, 2007 | 0.0133 | 4 | 1 | 0 | No | No | No | No | PADDINGTON |
| 11 | 716,000 | Mar. 17, 2007 | 0.0125 | 2 | 1 | 1 | No | No | No | No | LEICHHARDT |
| 12 | 952,000 | Mar. 21, 2007 | 0.0162 | 3 | 1 | 0 | No | No | No | No | BALMAIN |
| 13 | 1,125,000 | Mar. 21, 2007 | 0.0228 | 3 | 2 | 2 | No | No | Yes | No | BALMAIN |
| 14 | 705,000 | Mar. 21, 2007 | 0.0211 | 2 | 1 | 0 | No | No | No | No | LEICHHARDT |
| 15 | 997,500 | Mar. 24, 2007 | 0.0138 | 2 | 1 | 0 | No | No | No | No | PADDINGTON |
| 16 | 840,000 | Mar. 30, 2007 | 0.0185 | 2 | 1 | 1 | No | No | Yes | No | BALMAIN |
| 17 | 970,000 | Mar. 30, 2007 | 0.0142 | 3 | 1 | 0 | No | No | No | No | BALMAIN |
| 18 | 820,000 | Mar. 31, 2007 | 0.0204 | 3 | 2 | 2 | No | No | No | No | LEICHHARDT |
| 19 | 1,050,000 | Mar. 31, 2007 | 0.0126 | 3 | 3 | 0 | Yes | No | No | No | PADDINGTON |
| 20 | 1,020,000 | Mar. 31, 2007 | 0.0127 | 3 | 2 | 0 | No | No | No | No | PADDINGTON |
| 21 | 1,011,000 | Mar. 31, 2007 | 0.015 | 3 | 2 | 1 | No | No | No | No | PADDINGTON |
| 22 | 870,000 | Apr. 3, 2007 | 0.0228 | 3 | 1 | 0 | No | No | No | No | BALMAIN |
| 23 | 900,000 | Apr. 3, 2007 | 0.0139 | 2 | 2 | 1 | No | No | No | Yes | PADDINGTON |
| 24 | 920,000 | Apr. 11, 2007 | 0.0182 | 3 | 2 | 0 | No | No | No | No | PADDINGTON |
| 25 | 935,000 | Apr. 12, 2007 | 0.0157 | 3 | 2 | 0 | No | No | No | No | BALMAIN |
| 26 | 700,000 | Apr. 14, 2007 | 0.0171 | 2 | 1 | 0 | No | No | No | Yes | LEICHHARDT |
| 27 | 874,000 | Apr. 14, 2007 | 0.0144 | 2 | 1 | 0 | No | No | No | No | PADDINGTON |
| 28 | 836,000 | Apr. 19, 2007 | 0.0183 | 2 | 1 | 0 | Yes | No | No | No | BALMAIN |
| 29 | 1,145,000 | Apr. 19, 2007 | 0.0186 | 4 | 2 | 1 | No | Yes | No | No | PADDINGTON |
| 30 | 1,164,000 | Apr. 19, 2007 | 0.018 | 4 | 2 | 1 | No | Yes | No | No | PADDINGTON |
| 31 | 952,000 | Apr. 20, 2007 | 0.014 | 3 | 2 | 1 | No | No | No | Yes | BALMAIN |
| 32 | 710,000 | Apr. 21, 2007 | 0.0182 | 3 | 1 | 0 | No | No | No | No | BALMAIN |
| 33 | 870,000 | Apr. 27, 2007 | 0.0127 | 3 | 2 | 0 | No | No | No | No | BALMAIN |
| 34 | 690,000 | Apr. 28, 2007 | 0.0145 | 2 | 1 | 0 | No | No | No | No | LEICHHARDT |
| 35 | 700,000 | Apr. 28, 2007 | 0.0134 | 3 | 1 | 1 | No | No | No | No | LEICHHARDT |
| 36 | 703,000 | May 3, 2007 | 0.0177 | 2 | 1 | 1 | No | No | No | No | LEICHHARDT |
| 37 | 825,000 | May 5, 2007 | 0.013 | 4 | 3 | 1 | No | No | No | Yes | LEICHHARDT |
| 38 | 705,000 | May 8, 2007 | 0.0186 | 3 | 1 | 1 | No | No | No | No | LEICHHARDT |
| 39 | 1,050,000 | May 11, 2007 | 0.0177 | 3 | 2 | 0 | No | No | No | No | PADDINGTON |

TABLE 1-continued

Data
This table provides details of the sales observations used in the worked example. There are 56 house sales used with the following sales and attribute detail: sale price and date, suburb, and total property landsize; the number of bedrooms, bathrooms and carspaces; and the presence of a scenic view, a pool, waterfrontage, and air-conditioning.

| Observation ID | Sale Price | Sale Date | Landsize (ha) | Bedrooms | Bathrooms | Carspaces | Scenic View | Pool | Waterfront | Air-Con | Suburb |
|---|---|---|---|---|---|---|---|---|---|---|---|
| 40 | 820,000 | May 12, 2007 | 0.0127 | 3 | 2 | 0 | No | No | No | No | BALMAIN |
| 41 | 727,000 | May 12, 2007 | 0.0152 | 2 | 1 | 0 | No | No | No | No | BALMAIN |
| 42 | 715,000 | May 16, 2007 | 0.0156 | 2 | 2 | 0 | No | No | No | No | BALMAIN |
| 43 | 895,000 | May 24, 2007 | 0.0155 | 2 | 1 | 1 | No | No | Yes | No | BALMAIN |
| 44 | 796,000 | May 26, 2007 | 0.0158 | 3 | 1 | 1 | No | No | No | No | LEICHHARDT |
| 45 | 840,000 | May 28, 2007 | 0.0228 | 3 | 1 | 1 | No | No | No | No | BALMAIN |
| 46 | 920,000 | May 30, 2007 | 0.0211 | 4 | 2 | 0 | No | No | No | No | BALMAIN |
| 47 | 800,000 | Jun. 1, 2007 | 0.0227 | 3 | 1 | 0 | No | No | No | No | BALMAIN |
| 48 | 825,000 | Jun. 2, 2007 | 0.0169 | 2 | 1 | 0 | No | No | No | No | BALMAIN |
| 49 | 853,000 | Jun. 5, 2007 | 0.0184 | 4 | 2 | 0 | No | No | No | No | BALMAIN |
| 50 | 877,500 | Jun. 6, 2007 | 0.0133 | 3 | 1 | 0 | No | No | No | No | BALMAIN |
| 51 | 690,000 | Jun. 6, 2007 | 0.0196 | 3 | 1 | 2 | No | No | No | No | LEICHHARDT |
| 52 | 677,500 | Jun. 20, 2007 | 0.0186 | 2 | 1 | 1 | No | No | No | No | LEICHHARDT |
| 53 | 955,000 | Jun. 27, 2007 | 0.0146 | 4 | 2 | 0 | Yes | No | No | No | LEICHHARDT |
| 54 | 1,085,000 | Jun. 29, 2007 | 0.0199 | 3 | 2 | 0 | No | No | No | No | BALMAIN |
| 55 | 710,000 | Jun. 29, 2007 | 0.0191 | 2 | 1 | 0 | No | No | No | No | LEICHHARDT |
| 56 | 717,717 | Jun. 30, 2007 | 0.0183 | 2 | 1 | 0 | No | No | No | Yes | LEICHHARDT |

TABLE 2

Data for deriving transformations
This table sets out the manipulated data used to estimate the transformations which will be used in the house price index estimation. The 56 sales observations are those presented in Table 1, but with the necessary dummy variables substituted for the non binary hedonic attributes and suburb, and the logarithmic transformation of landsize and sale price. From this format, regression equation 2.5 is estimated.

| Obs ID | Sale Price | Sale Date | Landsize (ha) | ln[Sale Price] | ln[Landsize] | D[Beds = 2] | D[Beds = 4] |
|---|---|---|---|---|---|---|---|
| 1 | 1,105000 | Mar. 1, 2007 | 0.0196 | 13.915 | −3.9322 | 0 | 0 |
| 2 | 705,000 | Mar. 2, 2007 | 0.0181 | 13.466 | −4.0118 | 1 | 0 |
| 3 | 708,000 | Mar. 3, 2007 | 0.0143 | 13.470 | −4.2475 | 0 | 0 |
| 4 | 725,000 | Mar. 3, 2007 | 0.0205 | 13.494 | −3.8873 | 1 | 0 |
| 5 | 863,000 | Mar. 6, 2007 | 0.0186 | 13.668 | −3.9846 | 0 | 1 |
| 6 | 765,000 | Mar. 7, 2007 | 0.0149 | 13.548 | −4.2064 | 1 | 0 |
| 7 | 1,060,000 | Mar. 7, 2007 | 0.0181 | 13.874 | −4.0118 | 0 | 0 |
| 8 | 873,000 | Mar. 13, 2007 | 0.0131 | 13.68 | −4.3351 | 1 | 0 |
| 9 | 860,000 | Mar. 13, 2007 | 0.0197 | 13.665 | −3.9271 | 0 | 0 |
| 10 | 1,100,000 | Mar. 14, 2007 | 0.0133 | 13.911 | −4.32 | 0 | 1 |
| 11 | 716,000 | Mar. 17, 2007 | 0.0125 | 13.481 | −4.382 | 1 | 0 |

TABLE 2-continued

Data for deriving transformations
This table sets out the manipulated data used to estimate the transformations which
will be used in the house price index estimation. The 56 sales observations are those
presented in Table 1, but with the necessary dummy variables substituted for the non binary
hedonic attributes and suburb, and the logarithmic transformation of landsize and sale price.
From this format, regression equation 2.5 is estimated.

| | | | | | | | |
|---|---|---|---|---|---|---|---|
| 12 | 952,000 | Mar. 21, 2007 | 0.0162 | 13.766 | −4.1227 | 0 | 0 |
| 13 | 1,125,000 | Mar. 21, 2007 | 0.0228 | 13.933 | −3.781 | 0 | 0 |
| 14 | 705,000 | Mar. 21, 2007 | 0.0211 | 13.466 | −3.8585 | 1 | 0 |
| 15 | 997,500 | Mar. 24, 2007 | 0.0138 | 13.813 | −4.2831 | 1 | 0 |
| 16 | 840,000 | Mar. 30, 2007 | 0.0185 | 13.641 | −3.99 | 1 | 0 |
| 17 | 970,000 | Mar. 30, 2007 | 0.0142 | 13.785 | −4.2545 | 0 | 0 |
| 18 | 820,000 | Mar. 31, 2007 | 0.0204 | 13.617 | −3.8922 | 0 | 0 |
| 19 | 1,050,000 | Mar. 31, 2007 | 0.0126 | 13.864 | −4.3741 | 0 | 0 |
| 20 | 1,020,000 | Mar. 31, 2007 | 0.0127 | 13.835 | −4.3662 | 0 | 0 |
| 21 | 1,011,000 | Mar. 31, 2007 | 0.015 | 13.826 | −4.1997 | 0 | 0 |
| 22 | 870,000 | Apr. 3, 2007 | 0.0228 | 13.676 | −3.781 | 0 | 0 |
| 23 | 900,000 | Apr. 3, 2007 | 0.0139 | 13.71 | −4.2759 | 1 | 0 |
| 24 | 920,000 | Apr. 11, 2007 | 0.0182 | 13.732 | −4.0063 | 0 | 0 |
| 25 | 935,000 | Apr. 12, 2007 | 0.0157 | 13.748 | −4.1541 | 0 | 0 |
| 26 | 700,000 | Apr. 14, 2007 | 0.0171 | 13.459 | −4.0687 | 1 | 0 |
| 27 | 874,000 | Apr. 14, 2007 | 0.0144 | 13.681 | −4.2405 | 1 | 0 |
| 28 | 836,000 | Apr. 19, 2007 | 0.0183 | 13.636 | −4.0009 | 1 | 0 |
| 29 | 1,145,000 | Apr. 19, 2007 | 0.0186 | 13.951 | −3.9846 | 0 | 1 |
| 30 | 1,164,000 | Apr. 19, 2007 | 0.018 | 13.967 | −4.0174 | 0 | 1 |
| 31 | 952,000 | Apr. 20, 2007 | 0.014 | 13.766 | −4.2687 | 0 | 0 |
| 32 | 710,000 | Apr. 21, 2007 | 0.0182 | 13.473 | −4.0063 | 0 | 0 |
| 33 | 870,000 | Apr. 27, 2007 | 0.0127 | 13.676 | −4.3662 | 0 | 0 |
| 34 | 690,000 | Apr. 28, 2007 | 0.0145 | 13.444 | −4.2336 | 1 | 0 |
| 35 | 700,000 | Apr. 28, 2007 | 0.0134 | 13.459 | −4.3125 | 0 | 0 |
| 36 | 703,000 | May 3, 2007 | 0.0177 | 13.463 | −4.0342 | 1 | 0 |
| 37 | 825,000 | May 5, 2007 | 0.013 | 13.623 | −4.3428 | 0 | 1 |
| 38 | 705,000 | May 8, 2007 | 0.0186 | 13.466 | −3.9846 | 0 | 0 |
| 39 | 1,050,000 | May 11, 2007 | 0.0177 | 13.864 | −4.0342 | 0 | 0 |
| 40 | 820,000 | May 12, 2007 | 0.0127 | 13.617 | −4.3662 | 0 | 0 |
| 41 | 727,000 | May 12, 2007 | 0.0152 | 13.497 | −4.1865 | 1 | 0 |
| 42 | 715,000 | May 16, 2007 | 0.0156 | 13.48 | −4.1605 | 1 | 0 |
| 43 | 895,000 | May 24, 2007 | 0.0155 | 13.705 | −4.1669 | 1 | 0 |
| 44 | 796,000 | May 26, 2007 | 0.0158 | 13.587 | −4.1477 | 0 | 0 |
| 45 | 840,000 | May 28, 2007 | 0.0228 | 13.641 | −3.781 | 0 | 0 |
| 46 | 920,000 | May 30, 2007 | 0.0211 | 13.732 | −3.8585 | 0 | 1 |
| 47 | 800,000 | May 1, 2007 | 0.0227 | 13.592 | −3.7854 | 0 | 0 |

TABLE 2-continued

Data for deriving transformations
This table sets out the manipulated data used to estimate the transformations which will be used in the house price index estimation. The 56 sales observations are those presented in Table 1, but with the necessary dummy variables substituted for the non binary hedonic attributes and suburb, and the logarithmic transformation of landsize and sale price. From this format, regression equation 2.5 is estimated.

| 48 | 825,000 | Jun. 2, 2007 | 0.0169 | 13.623 | −4.0804 | 1 | 0 |
| 49 | 853,000 | Jun. 5, 2007 | 0.0184 | 13.657 | −3.9954 | 0 | 1 |
| 50 | 877,500 | Jun. 6, 2007 | 0.0133 | 13.685 | −4.32 | 0 | 0 |
| 51 | 690,000 | Jun. 6, 2007 | 0.0196 | 13.444 | −3.9322 | 0 | 0 |
| 52 | 677,500 | Jun. 20, 2007 | 0.0186 | 13.426 | −3.9846 | 1 | 0 |
| 53 | 955,000 | Jun. 27, 2007 | 0.0146 | 13.769 | −4.2267 | 0 | 1 |
| 54 | 1,085,000 | Jun. 29, 2007 | 0.0199 | 13.897 | −3.917 | 0 | 0 |
| 55 | 710,000 | Jun. 29, 2007 | 0.0191 | 13.473 | −3.958 | 1 | 0 |
| 56 | 717,717 | Jun. 30, 2007 | 0.0183 | 13.484 | −4.0009 | 1 | 0 |

| Obs ID | D[Baths = 1] | D[Baths = 3] | D[Cars = 0] | D[Cars = 2] | D[Suburb = Leichhardt] | D[Suburb = Paddington] |
|---|---|---|---|---|---|---|
| 1 | 0 | 0 | 0 | 0 | 0 | 0 |
| 2 | 1 | 0 | 1 | 0 | 0 | 0 |
| 3 | 1 | 0 | 1 | 0 | 1 | 0 |
| 4 | 1 | 0 | 1 | 0 | 1 | 0 |
| 5 | 0 | 1 | 0 | 1 | 1 | 0 |
| 6 | 1 | 0 | 1 | 0 | 0 | 0 |
| 7 | 1 | 0 | 0 | 0 | 0 | 1 |
| 8 | 1 | 0 | 1 | 0 | 0 | 0 |
| 9 | 0 | 0 | 0 | 1 | 1 | 0 |
| 10 | 1 | 0 | 0 | 1 | 0 | 1 |
| 11 | 1 | 0 | 0 | 0 | 1 | 0 |
| 12 | 1 | 0 | 0 | 0 | 0 | 0 |
| 13 | 0 | 0 | 0 | 1 | 0 | 0 |
| 14 | 1 | 0 | 1 | 0 | 1 | 0 |
| 15 | 1 | 0 | 1 | 0 | 0 | 1 |
| 16 | 1 | 0 | 0 | 0 | 0 | 0 |
| 17 | 1 | 0 | 1 | 0 | 0 | 0 |
| 18 | 0 | 0 | 0 | 1 | 1 | 0 |
| 19 | 0 | 1 | 1 | 0 | 0 | 1 |
| 20 | 0 | 0 | 1 | 0 | 0 | 1 |
| 21 | 0 | 0 | 0 | 0 | 0 | 1 |
| 22 | 1 | 0 | 1 | 0 | 0 | 0 |
| 23 | 0 | 0 | 0 | 0 | 0 | 1 |
| 24 | 0 | 0 | 1 | 0 | 0 | 1 |
| 25 | 0 | 0 | 0 | 0 | 0 | 0 |
| 26 | 1 | 0 | 1 | 0 | 1 | 0 |
| 27 | 1 | 0 | 1 | 0 | 0 | 1 |
| 28 | 1 | 0 | 1 | 0 | 0 | 0 |
| 29 | 0 | 0 | 0 | 0 | 0 | 1 |
| 30 | 0 | 1 | 0 | 1 | 0 | 1 |
| 31 | 0 | 0 | 0 | 0 | 0 | 0 |
| 32 | 1 | 0 | 1 | 0 | 0 | 0 |
| 33 | 0 | 0 | 0 | 1 | 0 | 0 |
| 34 | 1 | 0 | 1 | 0 | 1 | 0 |
| 35 | 1 | 0 | 0 | 0 | 1 | 0 |
| 36 | 1 | 0 | 0 | 0 | 1 | 0 |
| 37 | 0 | 1 | 0 | 0 | 1 | 0 |
| 38 | 1 | 0 | 0 | 0 | 1 | 0 |
| 39 | 0 | 0 | 1 | 0 | 0 | 1 |
| 40 | 0 | 0 | 1 | 0 | 0 | 0 |
| 41 | 1 | 0 | 1 | 0 | 0 | 0 |
| 42 | 0 | 0 | 1 | 0 | 0 | 0 |
| 43 | 1 | 0 | 0 | 0 | 0 | 0 |
| 44 | 1 | 0 | 0 | 0 | 1 | 0 |
| 45 | 1 | 0 | 0 | 0 | 0 | 0 |
| 46 | 0 | 1 | 1 | 0 | 0 | 0 |
| 47 | 1 | 0 | 1 | 0 | 0 | 0 |
| 48 | 1 | 0 | 1 | 0 | 0 | 0 |
| 49 | 0 | 0 | 1 | 0 | 0 | 0 |
| 50 | 1 | 0 | 1 | 0 | 0 | 0 |
| 51 | 1 | 0 | 0 | 1 | 1 | 0 |

TABLE 2-continued

Data for deriving transformations

This table sets out the manipulated data used to estimate the transformations which will be used in the house price index estimation. The 56 sales observations are those presented in Table 1, but with the necessary dummy variables substituted for the non binary hedonic attributes and suburb, and the logarithmic transformation of landsize and sale price. From this format, regression equation 2.5 is estimated.

| 52 | 1 | 0 | 0 | 0 | 1 | 0 |
| 53 | 0 | 0 | 1 | 0 | 1 | 0 |
| 54 | 0 | 0 | 1 | 0 | 0 | 0 |
| 55 | 1 | 0 | 1 | 0 | 1 | 0 |
| 56 | 1 | 0 | 1 | 0 | 1 | 0 |

TABLE 3A

Bedrooms

| | Tri-period 1: March-April-May | | | | Tri-period 2: April-May-June | | | |
|---|---|---|---|---|---|---|---|---|
| Panel A: Regression Statistics | | | | | | | | |
| Multiple R | | 0.8525 | | | | 0.8445 | | |
| R Square | | 0.7267 | | | | 0.7132 | | |
| Adjusted R Square | | 0.6925 | | | | 0.6638 | | |
| Standard Error | | 0.0884 | | | | 0.0876 | | |
| Observations | | 46 | | | | 35 | | |
| Panel B: Coefficient Estimates | | | | | | | | |
| | Coefficients | Standard Error | t Stat | P-value | Coefficients | Standard Error | t Stat | P-value |
| Intercept | 14.0107 | 0.3091 | 45.3201 | 5.3E−36 | 13.5309 | 0.3657 | 37.0022 | 5.8E−26 |
| lnsize | 0.0737 | 0.0757 | 0.9736 | 0.3361 | −0.0321 | 0.0898 | −0.3576 | 0.7232 |
| Bed2 | −0.1104 | 0.0286 | −3.8532 | 0.0004 | −0.0771 | 0.0337 | −2.2861 | 0.0297 |
| Bed4 | 0.0775 | 0.0417 | 1.8609 | 0.0701 | 0.1199 | 0.0432 | 2.7762 | 0.0095 |
| sub2 | −0.1468 | 0.0311 | −4.7187 | 2.9E−05 | −0.1359 | 0.0341 | −3.9885 | 0.0004 |
| sub3 | 0.1412 | 0.0342 | 4.1232 | 0.0002 | 0.141 | 0.0428 | 3.2919 | 0.0026 |

TABLE 3B

Bathrooms

| | Tri-period 1: March-April-May | | | | Tri-period 2: April-May-June | | | |
|---|---|---|---|---|---|---|---|---|
| Panel A: Regression Statistics | | | | | | | | |
| Multiple R | | 0.8133 | | | | 0.8226 | | |
| R Square | | 0.6614 | | | | 0.6767 | | |
| Adjusted R Square | | 0.6191 | | | | 0.6209 | | |
| Standard Error | | 0.0984 | | | | 0.0931 | | |
| Observations | | 46 | | | | 35 | | |
| Panel B: Coefficient Estimates | | | | | | | | |
| | Coefficients | Standard Error | t Stat | P-value | Coefficients | Standard Error | t Stat | P-value |
| Intercept | 14.2079 | 0.3409 | 41.6805 | 1.41E−34 | 14.1042 | 0.4174 | 33.7878 | 7.67E−25 |
| lnsize | 0.1199 | 0.0833 | 1.4389 | 0.158 | 0.0952 | 0.1004 | 0.9482 | 0.3509 |
| Bath1 | −0.086 | 0.0335 | −2.5669 | 0.0141 | −0.1261 | 0.0406 | −3.106 | 0.0042 |
| Bath3 | 0.052 | 0.0517 | 1.0053 | 0.3208 | 0.0544 | 0.0615 | 0.8845 | 0.3837 |
| sub2 | −0.1374 | 0.0351 | −3.9193 | 0.0003 | −0.1048 | 0.0379 | −2.7644 | 0.0098 |
| sub3 | 0.1484 | 0.0378 | 3.9295 | 0.0003 | 0.1151 | 0.0461 | 2.4962 | 0.0189 |

TABLE 3C

| | Carspaces | | | | | | | |
|---|---|---|---|---|---|---|---|---|
| | Tri-period 1: March-April-May | | | | Tri-period 2: April-May-June | | | |
| | Panel A: Regression Statistics | | | | | | | |
| Multiple R | 0.8496 | | | | 0.7311 | | | |
| R Square | 0.7218 | | | | 0.5345 | | | |
| Adjusted R Square | 0.687 | | | | 0.4543 | | | |
| Standard Error | 0.0892 | | | | 0.1117 | | | |
| Observations | 46 | | | | 35 | | | |
| | Panel B: Coefficient Estimates | | | | | | | |
| | Coefficients | Standard Error | t Stat | P-value | Coefficients | Standard Error | t Stat | P-value |
| Intercept | 14.0385 | 0.3151 | 44.5503 | 1.04E−35 | 13.7617 | 0.4753 | 28.9516 | 5.97E−23 |
| lnsize | 0.0808 | 0.0767 | 1.0538 | 0.2983 | 0.0194 | 0.1152 | 0.1686 | 0.8672 |
| Cars0 | −0.0877 | 0.029 | −3.0201 | 0.0044 | −0.043 | 0.0428 | −1.0065 | 0.3225 |
| Cars2 | 0.091 | 0.0408 | 2.2325 | 0.0312 | 0.015 | 0.0727 | 0.2061 | 0.8382 |
| sub2 | −0.17 | 0.0316 | −5.3738 | 3.57E−06 | −0.157 | 0.0437 | −3.59 | 0.0012 |
| sub3 | 0.1634 | 0.0335 | 4.8808 | 1.73E−05 | 0.1545 | 0.0539 | 2.8679 | 0.0076 |

TABLE 3D

Estimated Transformations

| Attribute | Observed | Transformation |
|---|---|---|
| Bedrooms | 2 | −0.0937 |
| Bedrooms | 3 | 0 |
| Bedrooms | 4 | 0.0987 |
| Bathrooms | 1 | −0.1061 |
| Bathrooms | 2 | 0 |
| Bathrooms | 3 | 0.0532 |
| Carspaces | 0 | −0.0654 |
| Carspaces | 1 | 0 |
| Carspaces | 2 | 0.053 |

TABLE 4

Transformed Data

This table contains the transformed data in the format necessary for the final index estimation as set out in Equation 2.1. The dependant sale price variable has been transformed, log[Sale Price], as have the non-binary hedonic variables, where landsize has been replaced by its logarithmic transformation, and bedrooms, bathrooms, and carspaces observations have been substituted with their respective transformed value as set out in Table 3D. Binary variables, including suburb, have been replaced with dummy variables, and the month of sale has been replaced with a dummy variable as well.

| ID | ln[Sale Price] | ln[Land-size] | T[Bedrms] | T[Bathrms] | T[Cars] | D[Water] | D[View] | D[Pool] |
|---|---|---|---|---|---|---|---|---|
| 1 | 13.9154 | −3.9322 | 0.0000 | 0 | −0.0654 | 0 | 0 | 0 |
| 2 | 13.4660 | −4.0118 | −0.0937 | −0.1061 | −0.0654 | 0 | 0 | 0 |
| 3 | 13.4702 | −4.2475 | 0.0000 | −0.1061 | −0.0654 | 0 | 0 | 0 |
| 4 | 13.4939 | −3.8873 | −0.0937 | −0.1061 | −0.0654 | 0 | 0 | 0 |
| 5 | 13.6682 | −3.9846 | 0.0987 | −0.1061 | −0.0654 | 0 | 0 | 0 |
| 6 | 13.5476 | −4.2064 | −0.0937 | −0.1061 | −0.0654 | 0 | 0 | 0 |
| 7 | 13.8738 | −4.0118 | 0.0000 | −0.1061 | 0 | 0 | 0 | 0 |
| 8 | 13.6797 | −4.3351 | −0.0937 | −0.1061 | −0.0654 | 0 | 0 | 0 |
| 9 | 13.6647 | −3.9271 | 0.0000 | 0 | 0.0530 | 0 | 0 | 0 |
| 10 | 13.9108 | −4.3200 | 0.0987 | −0.1061 | −0.0654 | 0 | 0 | 0 |
| 11 | 13.4814 | −4.3820 | −0.0937 | −0.1061 | 0 | 0 | 0 | 0 |
| 12 | 13.7663 | −4.1227 | 0.0000 | −0.1061 | −0.0654 | 0 | 0 | 0 |
| 13 | 13.9333 | −3.7810 | 0.0000 | 0 | 0.0530 | 1 | 0 | 0 |
| 14 | 13.4660 | −3.8585 | −0.0937 | −0.1061 | −0.0654 | 0 | 0 | 0 |
| 15 | 13.8130 | −4.2831 | −0.0937 | −0.1061 | −0.0654 | 0 | 0 | 0 |
| 16 | 13.6412 | −3.9900 | −0.0937 | −0.1061 | 0 | 1 | 0 | 0 |
| 17 | 13.7851 | −4.2545 | 0.0000 | −0.1061 | −0.0654 | 0 | 0 | 0 |
| 18 | 13.6171 | −3.8922 | 0.0000 | 0 | 0.0530 | 0 | 0 | 0 |
| 19 | 13.8643 | −4.3741 | 0.0000 | 0.0532 | −0.0654 | 0 | 1 | 0 |
| 20 | 13.8353 | −4.3662 | 0.0000 | 0 | −0.0654 | 0 | 0 | 0 |
| 21 | 13.8265 | −4.1997 | 0.0000 | 0 | 0 | 0 | 0 | 0 |
| 22 | 13.6762 | −3.7810 | 0.0000 | −0.1061 | −0.0654 | 0 | 0 | 0 |
| 23 | 13.7102 | −4.2759 | −0.0937 | 0 | 0 | 0 | 0 | 0 |
| 24 | 13.7321 | −4.0063 | 0.0000 | 0 | −0.0654 | 0 | 0 | 0 |
| 25 | 13.7483 | −4.1541 | 0.0000 | 0 | −0.0654 | 0 | 0 | 0 |

TABLE 4-continued

Transformed Data

This table contains the transformed data in the format necessary for the final index estimation as set out in Equation 2.1. The dependant sale price variable has been transformed, log[Sale Price], as have the non-binary hedonic variables, where landsize has been replaced by its logarithmic transformation, and bedrooms, bathrooms, and carspaces observations have been substituted with their respective transformed value as set out in Table 3D. Binary variables, including suburb, have been replaced with dummy variables, and the month of sale has been replaced with a dummy variable as well.

| | | | | | | | |
|---|---|---|---|---|---|---|---|
| 26 | 13.4588 | −4.0687 | −0.0937 | −0.1061 | −0.0654 | 0 | 0 | 0 |
| 27 | 13.6808 | −4.2405 | −0.0937 | −0.1061 | −0.0654 | 0 | 0 | 0 |
| 28 | 13.6364 | −4.0009 | −0.0937 | −0.1061 | −0.0654 | 0 | 1 | 0 |
| 29 | 13.9509 | −3.9846 | 0.0987 | 0 | 0 | 0 | 0 | 1 |
| 30 | 13.9674 | −4.0174 | 0.0987 | 0 | 0 | 0 | 0 | 1 |
| 31 | 13.7663 | −4.2687 | 0.0000 | 0 | 0 | 0 | 0 | 0 |
| 32 | 13.4730 | −4.0063 | 0.0000 | −0.1061 | −0.0654 | 0 | 0 | 0 |
| 33 | 13.6762 | −4.3662 | 0.0000 | 0 | −0.0654 | 0 | 0 | 0 |
| 34 | 13.4444 | −4.2336 | −0.0937 | −0.1061 | −0.0654 | 0 | 0 | 0 |
| 35 | 13.4588 | −4.3125 | 0.0000 | −0.1061 | 0 | 0 | 0 | 0 |
| 36 | 13.4631 | −4.0342 | −0.0937 | −0.1061 | 0 | 0 | 0 | 0 |
| 37 | 13.6231 | −4.3428 | 0.0987 | 0.0532 | 0 | 0 | 0 | 0 |
| 38 | 13.4660 | −3.9846 | 0.0000 | −0.1061 | 0 | 0 | 0 | 0 |
| 39 | 13.8643 | −4.0342 | 0.0000 | 0 | −0.0654 | 0 | 0 | 0 |
| 40 | 13.6171 | −4.3662 | 0.0000 | 0 | −0.0654 | 0 | 0 | 0 |
| 41 | 13.4967 | −4.1865 | −0.0937 | −0.1061 | −0.0654 | 0 | 0 | 0 |
| 42 | 13.4800 | −4.1605 | −0.0937 | 0 | −0.0654 | 0 | 0 | 0 |
| 43 | 13.7046 | −4.1669 | −0.0937 | −0.1061 | 0 | 1 | 0 | 0 |
| 44 | 13.5874 | −4.1477 | 0.0000 | −0.1061 | 0 | 0 | 0 | 0 |
| 45 | 13.6412 | −3.7810 | 0.0000 | −0.1061 | 0 | 0 | 0 | 0 |
| 46 | 13.7321 | −3.8585 | 0.0987 | 0 | −0.0654 | 0 | 0 | 0 |
| 47 | 13.5924 | −3.7854 | 0.0000 | −0.1061 | −0.0654 | 0 | 0 | 0 |
| 46 | 13.6231 | −4.0804 | −0.0937 | −0.1061 | −0.0654 | 0 | 0 | 0 |
| 49 | 13.6565 | −3.9954 | 0.0987 | 0 | −0.0654 | 0 | 0 | 0 |
| 50 | 13.6848 | −4.3200 | 0.0000 | −0.1061 | −0.0654 | 0 | 0 | 0 |
| 51 | 13.4444 | −3.9322 | 0.0000 | −0.1061 | 0.0530 | 0 | 0 | 0 |
| 52 | 13.4262 | −3.9846 | −0.0937 | −0.1061 | 0 | 0 | 1 | 0 |
| 53 | 13.7695 | −4.2267 | 0.0987 | 0 | −0.0654 | 0 | 0 | 0 |
| 54 | 13.8971 | −3.9170 | 0.0000 | 0 | −0.0654 | 0 | 0 | 0 |
| 55 | 13.4730 | −3.9581 | −0.0937 | −0.1061 | −0.0654 | 0 | 0 | 0 |
| 56 | 13.4838 | −4.0009 | −0.0937 | −0.1061 | −0.0654 | 0 | 0 | 0 |

| ID | D[Air-Con] | D[Suburb = Leichhardt] | D[Suburb = Paddington] | $T_1$ (T = 1) | $T_2$ (T = 1) | $T_1$ (T = 2) | $T_2$ (T = 2) |
|---|---|---|---|---|---|---|---|
| 1 | 0 | 0 | 0 | 0 | 0 | 0 | 0 |
| 2 | 0 | 0 | 0 | 0 | 0 | 0 | 0 |
| 3 | 0 | 1 | 0 | 0 | 0 | 0 | 0 |
| 4 | 0 | 1 | 0 | 0 | 0 | 0 | 0 |
| 5 | 0 | 1 | 0 | 0 | 0 | 0 | 0 |
| 6 | 0 | 0 | 0 | 0 | 0 | 0 | 0 |
| 7 | 0 | 0 | 1 | 0 | 0 | 0 | 0 |
| 8 | 0 | 0 | 0 | 0 | 0 | 0 | 0 |
| 9 | 0 | 1 | 0 | 0 | 0 | 0 | 0 |
| 10 | 0 | 0 | 1 | 0 | 0 | 0 | 0 |
| 11 | 0 | 1 | 0 | 0 | 0 | 0 | 0 |
| 12 | 0 | 0 | 0 | 0 | 0 | 0 | 0 |
| 13 | 0 | 0 | 0 | 0 | 0 | 0 | 0 |
| 14 | 0 | 1 | 0 | 0 | 0 | 0 | 0 |
| 15 | 0 | 0 | 1 | 0 | 0 | 0 | 0 |
| 16 | 0 | 0 | 0 | 0 | 0 | 0 | 0 |
| 17 | 0 | 0 | 0 | 0 | 0 | 0 | 0 |
| 18 | 0 | 1 | 0 | 0 | 0 | 0 | 0 |
| 19 | 0 | 0 | 1 | 0 | 0 | 0 | 0 |
| 20 | 0 | 0 | 1 | 0 | 0 | 0 | 0 |
| 21 | 0 | 0 | 1 | 0 | 0 | 0 | 0 |
| 22 | 0 | 0 | 0 | 1 | 0 | 0 | 0 |
| 23 | 1 | 0 | 1 | 1 | 0 | 0 | 0 |
| 24 | 0 | 0 | 1 | 1 | 0 | 0 | 0 |
| 25 | 0 | 0 | 0 | 1 | 0 | 0 | 0 |
| 26 | 1 | 1 | 0 | 1 | 0 | 0 | 0 |
| 27 | 0 | 0 | 1 | 1 | 0 | 0 | 0 |
| 28 | 0 | 0 | 0 | 1 | 0 | 0 | 0 |
| 29 | 0 | 0 | 1 | 1 | 0 | 0 | 0 |
| 30 | 0 | 0 | 1 | 1 | 0 | 0 | 0 |
| 31 | 1 | 0 | 0 | 1 | 0 | 0 | 0 |
| 32 | 0 | 0 | 0 | 1 | 0 | 0 | 0 |
| 33 | 0 | 0 | 0 | 1 | 0 | 0 | 0 |
| 34 | 0 | 1 | 0 | 1 | 0 | 0 | 0 |
| 35 | 0 | 1 | 0 | 1 | 0 | 0 | 0 |

TABLE 4-continued

Transformed Data
This table contains the transformed data in the format necessary for the final index estimation as set out in Equation 2.1. The dependant sale price variable has been transformed, log[Sale Price], as have the non-binary hedonic variables, where landsize has been replaced by its logarithmic transformation, and bedrooms, bathrooms, and carspaces observations have been substituted with their respective transformed value as set out in Table 3D. Binary variables, including suburb, have been replaced with dummy variables, and the month of sale has been replaced with a dummy variable as well.

| | | | | | | | |
|---|---|---|---|---|---|---|---|
| 36 | 0 | 1 | 0 | 0 | 1 | 1 | 0 |
| 37 | 1 | 1 | 0 | 0 | 1 | 1 | 0 |
| 38 | 0 | 1 | 0 | 0 | 1 | 1 | 0 |
| 39 | 0 | 0 | 1 | 0 | 1 | 1 | 0 |
| 40 | 0 | 0 | 0 | 0 | 1 | 1 | 0 |
| 41 | 0 | 0 | 0 | 0 | 1 | 1 | 0 |
| 42 | 0 | 0 | 0 | 0 | 1 | 1 | 0 |
| 43 | 0 | 0 | 0 | 0 | 1 | 1 | 0 |
| 44 | 0 | 1 | 0 | 0 | 1 | 1 | 0 |
| 45 | 0 | 0 | 0 | 0 | 1 | 1 | 0 |
| 46 | 0 | 0 | 0 | 0 | 1 | 1 | 0 |
| 47 | 0 | 0 | 0 | 0 | 0 | 0 | 1 |
| 46 | 0 | 0 | 0 | 0 | 0 | 0 | 1 |
| 49 | 0 | 0 | 0 | 0 | 0 | 0 | 1 |
| 50 | 0 | 0 | 0 | 0 | 0 | 0 | 1 |
| 51 | 0 | 1 | 0 | 0 | 0 | 0 | 1 |
| 52 | 0 | 1 | 0 | 0 | 0 | 0 | 1 |
| 53 | 0 | 1 | 0 | 0 | 0 | 0 | 1 |
| 54 | 0 | 0 | 0 | 0 | 0 | 0 | 1 |
| 55 | 0 | 1 | 0 | 0 | 0 | 0 | 1 |
| 56 | 1 | 1 | 0 | 0 | 0 | 0 | 1 |

TABLE 5

Hedonic Index Regression

| | Tri-period 1: March-April-May | | | | Tri-period 2: April-May-June | | | |
|---|---|---|---|---|---|---|---|---|
| Panel A: Regression Statistics | | | | | | | | |
| Multiple R | 0.9131 | | | | 0.9014 | | | |
| R Square | 0.8338 | | | | 0.8125 | | | |
| Adjusted R Square | 0.7734 | | | | 0.7103 | | | |
| Standard Error | 0.0759 | | | | 0.0814 | | | |
| Observations | 46 | | | | 35 | | | |
| Panel B: Coefficient Estimates | | | | | | | | |
| | Coefficient Estimate | Standard Error | t Stat | P-value | Coefficient Estimate | Standard Error | t Stat | P-value |
| Intercept | 13.9394 | 0.2879 | 48.4135 | 3.12E−32 | 13.7968 | 0.4208 | 32.7841 | 3.59E−20 |
| Ln[Land-size] | 0.0427 | 0.0705 | 0.6059 | 0.5488 | 0.0317 | 0.0992 | 0.3194 | 0.7525 |
| T[Bedrooms] | 0.9688 | 0.2208 | 4.3872 | 0.0001 | 0.6176 | 0.3176 | 1.9445 | 0.0647 |
| T[Bathrooms] | 0.3073 | 0.2626 | 1.1704 | 0.2502 | 0.6498 | 0.4331 | 1.5002 | 0.1478 |
| T[Carspaces] | 0.3418 | 0.3990 | 0.8566 | 0.3979 | −0.1084 | 0.5218 | −0.2077 | 0.8374 |
| D[Water] | 0.0945 | 0.0576 | 1.6399 | 0.1105 | 0.1723 | 0.0950 | 1.8138 | 0.0834 |
| D[View] | 0.0418 | 0.0581 | 0.7197 | 0.4768 | 0.1025 | 0.0633 | 1.6178 | 0.1199 |
| D[Pool] | 0.0473 | 0.0709 | 0.6677 | 0.5090 | 0.1108 | 0.0849 | 1.3054 | 0.2052 |
| D[Air-Con] | 0.0306 | 0.0481 | 0.6359 | 0.5292 | 0.0245 | 0.0481 | 0.5103 | 0.6150 |
| D[Suburb = Leichhardt] | −0.1471 | 0.0322 | −4.5601 | 6.7E−05 | −0.1149 | 0.0398 | −2.8845 | 0.0086 |
| D[Suburb = Paddington] | 0.1188 | 0.0326 | 3.6425 | 0.0009 | 0.1174 | 0.0507 | 2.3171 | 0.0302 |
| $\lambda_1 T_1$ | −0.0711 | 0.0310 | −2.2934 | 0.0283 | −0.0057 | 0.0398 | −0.1439 | 0.8869 |
| $\lambda_2 T_2$ | −0.0842 | 0.0295 | −2.8555 | 0.0074 | 0.0345 | 0.0399 | 0.8659 | 0.3959 |

TABLE 6

| | Bias-Corrected Lamda | | | | | | |
|---|---|---|---|---|---|---|---|
| | T = 1 | | | | T = 2 | | |
| | Lamda Estimate | Standard Error ($\sigma$) | Bias Corrected Lamda | | Lamda Estimate | Standard Error ($\sigma$) | Bias Corrected Lamda |
| $\lambda_1$ | −0.0711 | 0.031 | −0.0712 | $\lambda_1$ | −0.0057 | 0.0398 | −0.0057 |
| $\lambda_2$ | −0.0842 | 0.0295 | −0.0842 | $\lambda_2$ | 0.0345 | 0.0399 | 0.0345 |

TABLE 7

| | Hedonic House Price Index | | | |
|---|---|---|---|---|
| | Index (T = 1) | Status (T = 1) | Index (T = 2) | Status (T = 2) |
| March 2007 | 548.289 | Base | 548.289 | Base |
| April 2007 | 510.630 | Fixed | 510.630 | Fixed |
| May 2007 | 503.993 | Indicative | 507.710 | Fixed |
| June 2007 | | | 528.577 | Indicative |

The invention claimed is:

1. A computer-implemented method of generating a real estate property index, the method comprising:
inputting into a data store of a computing apparatus real estate data comprising property data, price data and time of sale data representing historical real estate sales transactions in a predetermined real estate market,
using said computer apparatus to manipulate said real estate data to group same into consecutive triple times based on said time of sale data,
using said computer apparatus to generate a logarithmic transform function using said manipulated data with two time dummy variables corresponding to two consecutive time periods respectively bounded by the triple consecutive times,
using said computer apparatus to extract the coefficients of the two time dummy variables of said logarithmic transform function for said two consecutive time periods,
adding said two extracted coefficients in said computer apparatus to generate a transformed growth rate from the first to the last of said triple times, and
generating said index from said transformed growth rate by calculating the anti-logarithm of said logarithmic transform function,
wherein said logarithmic transform function has the form:

$$\log P_i(t) = \alpha(t) + \sum_{j=1}^{N} \beta_j f_j(X_{i,j}) + \sum_{t=1}^{T} \lambda(t)D(t) + \varepsilon_i(t)$$

where:
$P_i(t)$ is the selling price of property i at time t,
$\alpha(t)$ is the intercept term,
X is a vector of the N hedonic attributes included in the model,
$\beta_j$ is the regression coefficient reflecting the implicit price of $j^{th}$ attribute,
$\lambda(t)$ estimates the cumulative growth rate to time t,
D(t) is a set of dummy variables equal to 1 if the property sold in time-period t and zero otherwise, and
$\varepsilon_i(t)$ is the random variation in price of property i at time t unaccounted for by the other terms.

2. The method of claim 1, further comprising:
transforming attribute values Xj of said logarithmic transform function by continuous piecewise linear functions fj prior to determining to coefficients βj via multi linear regression.

3. A computer-implemented method of generating a real estate property index, the method comprising:
inputting into a data store of a computing apparatus real estate data comprising property data, price data and time of sale data representing historical real estate sales transactions in a predetermined real estate market,
using said computer apparatus to manipulate said real estate data to group same into consecutive triple times based on said time of sale data,
using said computer apparatus to generate a logarithmic transform function using said manipulated data with two time dummy variables corresponding to two consecutive time periods respectively bounded by the triple consecutive times,
using said computer apparatus to extract the coefficients of the two time dummy variables of said logarithmic transform function for said two consecutive time periods,
adding said two extracted coefficients in said computer apparatus to generate a transformed growth rate from the first to the last of said triple times, and
generating said index from said transformed growth rate by calculating the anti-logarithm of said logarithmic transform function,
wherein said logarithmic transform function is:

$$\log P_i = c_0(T_k) + \sum_{j=1}^{m} s_j(T_k)S_j + \sum_{j=1}^{n} c_j(T_k)f_j(x_j) + \lambda_1(T_k)\tau_1 + \lambda_2(T_k)\tau_2 + \varepsilon_k$$

where:
$f_j$ are transformations of the hedonic variables,
$c_j$ are time varying numerical coefficients,
$S_j$ are dummy variables with $S_j=1$ if property i is in suburb j,
$s_j$ are time varying numerical coefficients of the suburb dummy variables,
$\tau_1$ is a dummy variable with $\tau_1=1$ if the sale occurred in period $T_{k-1}$ and $\tau_1=0$ otherwise,
$\tau_2$ is a dummy variable with $\tau_2=1$ if the sale occurred in period $T_k$ and $\tau_2=0$ otherwise, and
$\varepsilon_k$ is the (zero mean) residual error term.

4. The method of claim 1, wherein the logarithm of sale prices is linear with respect to the logarithm of land sizes.

5. The method of claim 1, further comprising:
for each set of triple times, regressing said logarithmic transform function against the logarithmic of land prices to obtain an index growth rate.

6. The method of claim 1, further comprising:
using a mean square error estimation method to adjust the convexity of said logarithmic transform function.

7. The method as claimed in claim 1 wherein said index comprises a capital gains index.

8. The method of claim 1, further comprising:
adding an imputed or actual rental income for each of two consecutive time periods to form an accumulation index.

9. The method of claim 8, wherein said rental income is regressed.

10. The method of claim 1, further comprising periodically rebasing said index to accurately represent changes in value in said real estate market over extended periods of time, and/or to accurately represent absolute market prices.

11. A computer-implemented system for generating a real property index, the system comprising:
a data storage device into which is input real estate data comprising property data, price data and time of sale data representing historical real estate transactions in a predetermined real estate market;
a data manipulator connected to said data storage device to manipulate said real estate data into groups of consecutive triples times based on said time of sale data;
a transform generator connected to said data manipulator to generate a logarithmic transform function using said manipulated data with two time dummy variables corresponding to two consecutive time periods respectively bounded by a triple consecutive times;
a coefficient extractor connected with said transform generator to extract the coefficients of the two time dummy variables of said logarithmic transform function for said two consecutive time periods;
an adding circuit connected to said coefficient extractor to add said two extracted coefficients to generate a transformed growth rate from the first to the last of said triple times; and
an anti-logarithmic transfer function generator connected to said adding circuit to generate said logarithmic growth rate by calculating the anti-logarithm thereof, and wherein said logarithmic transform function has the form:

$$\log P_i(t) = \alpha(t) + \sum_{j=1}^{N} \beta_j f_j(X_{i,j}) + \sum_{t=1}^{T} \lambda(t)D(t) + \varepsilon_i(t)$$

where:
$P_i(t)$ is the selling price of property i at time t,
$\alpha(t)$ is the intercept term,
X is a vector of the N hedonic attributes included in the model,
$\beta_j$ is the regression coefficient reflecting the implicit price of $j^{th}$ attribute,
$\lambda(t)$ estimates the cumulative growth rate to time t,
D(t) is a set of dummy variables equal to 1 if the property sold in time-period t and zero otherwise, and
$\varepsilon_i(t)$ is the random variation in price of property i at time t unaccounted for by the other terms.

12. A computer-implemented system for generating a real property index, the system comprising:
a data storage device into which is input real estate data comprising property data, price data and time of sale data representing historical real estate transactions in a predetermined real estate market;
a data manipulator connected to said data storage device to manipulate said real estate data into groups of consecutive triples times based on said time of sale data;
a transform generator connected to said data manipulator to generate a logarithmic transform function using said manipulated data with two time dummy variables corresponding to two consecutive time periods respectively bounded by a triple consecutive times;
a coefficient extractor connected with said transform generator to extract the coefficients of the two time dummy variables of said logarithmic transform function for said two consecutive time periods;
an adding circuit connected to said coefficient extractor to add said two extracted coefficients to generate a transformed growth rate from the first to the last of said triple times; and
an anti-logarithmic transfer function generator connected to said adding circuit to generate said logarithmic growth rate by calculating the anti-logarithm thereof, and wherein said logarithmic transform function has the form:

$$\log P_i = c_0(T_k) + \sum_{j=1}^{m} s_j(T_k)S_j + \sum_{j=1}^{n} c_j(T_k)f_j(x_j) + \lambda_1(T_k)\tau_1 + \lambda_2(T_k)\tau_2 + \varepsilon_k$$

where:
$f_j$ are transformations of the hedonic variables,
$c_j$ are time varying numerical coefficients,
$S_j$ are dummy variables with $S_j=1$ if property i is in suburb j,
$s_j$ are time varying numerical coefficients of the suburb dummy variables,
$\tau_1$ is a dummy variable with $\tau_1=1$ if the sale occurred in period $T_{k-1}$ and $\tau_1=0$ otherwise,
$\tau_2$ is a dummy variable with $\tau_2=1$ if the sale occurred in period $T_k$ and $\tau_2=0$ otherwise, and
$\varepsilon_k$ is the (zero mean) residual error term.

* * * * *